United States Patent
Behrens et al.

(10) Patent No.: US 11,681,017 B2
(45) Date of Patent: Jun. 20, 2023

(54) METHOD AND APPARATUS FOR MITIGATION OF LOW FREQUENCY NOISE IN RADAR SYSTEMS

(71) Applicant: UHNDER, INC., Austin, TX (US)

(72) Inventors: Richard Behrens, Basalt, CO (US); Frederick Rush, Austin, TX (US); Monier Maher, St. Louis, MO (US); Murtaza Ali, Cedar Park, TX (US)

(73) Assignee: Uhnder, Inc., Austin, TX (US)

(*) Notice: Subject to any disclaimer, the term of this patent is extended or adjusted under 35 U.S.C. 154(b) by 358 days.

(21) Appl. No.: 16/815,320

(22) Filed: Mar. 11, 2020

(65) Prior Publication Data

US 2020/0292665 A1 Sep. 17, 2020

Related U.S. Application Data

(60) Provisional application No. 62/816,941, filed on Mar. 12, 2019.

(51) Int. Cl.
*G01S 7/35* (2006.01)
*G01S 13/32* (2006.01)
(Continued)

(52) U.S. Cl.
CPC ........... *G01S 7/354* (2013.01); *G01S 7/40* (2013.01); *G01S 7/4017* (2013.01);
(Continued)

(58) Field of Classification Search
CPC ........ G01S 13/931; G01S 7/352; G01S 7/354; G01S 7/358; G01S 2013/93271;
(Continued)

(56) References Cited

U.S. PATENT DOCUMENTS 1,882,128 A 10/1932 Fearing
3,374,478 A 3/1968 Blau
(Continued)

FOREIGN PATENT DOCUMENTS

EP 0725480 11/2011
EP 2374217 4/2013
(Continued)

OTHER PUBLICATIONS

A. Bourdoux, U. Ahmad, D. Guermandi, S. Brebels, A. Dewilde, W. Van Thillo, PMCW Waveform and MIMO Technique for a 79 GHz CMOS Automotive Radar. 2016 IEEE Radar Conference (RadarConf), 2016, pp. 1-5, doi: 10.1109/RADAR.2016.7485114. (Year: 2016).*
(Continued)

*Primary Examiner* — Olumide Ajibade Akonai
(74) *Attorney, Agent, or Firm* — Gardner, Linn, Burkhart & Ondersma LLP

(57) ABSTRACT

A radar sensing system includes a transmitter and a receiver. The transmitter is configured to transmit a radio signal. The receiver is configured to receive radio signals that include the transmitted radio signal reflected from objects in the environment. The transmitter and receiver are configured to distribute the signal power over frequency so that it is separated from noise and impairments at DC and low frequencies as may be caused by some radar system components which introduce DC offsets and/or low frequency (e.g. flicker) noise.

20 Claims, 25 Drawing Sheets

TX antennas

Transmitters

RX antennas

Receivers

Radar System

Network Interface

(51) Int. Cl.
  *G01S 13/36* (2006.01)
  *G01S 7/40* (2006.01)
  *G01S 13/931* (2020.01)
(52) U.S. Cl.
  CPC ............ *G01S 13/325* (2013.01); *G01S 13/36* (2013.01); *G01S 7/356* (2021.05); *G01S 7/358* (2021.05); *G01S 13/931* (2013.01)
(58) Field of Classification Search
  CPC ........ G01S 7/032; G01S 7/282; G01S 13/343; G01S 2013/0245; G01S 7/285; G01S 7/2886; G01S 7/40; G01S 7/4017; G01S 13/325; G01S 13/36; G01S 7/356; G01S 13/584
  See application file for complete search history.

(56) References Cited

U.S. PATENT DOCUMENTS

| | | | |
|---|---|---|---|
| 3,735,398 A | 5/1973 | Ross | |
| 3,750,169 A | 7/1973 | Strenglein | |
| 3,766,554 A | 10/1973 | Tresselt | |
| 3,896,434 A | 7/1975 | Sirven | |
| 3,932,871 A | 1/1976 | Foote | |
| 4,078,234 A | 3/1978 | Fishbein et al. | |
| 4,176,351 A | 11/1979 | De Vita et al. | |
| 4,308,536 A | 12/1981 | Sims, Jr. et al. | |
| 4,566,010 A | 1/1986 | Collins | |
| 4,612,547 A | 9/1986 | Itoh | |
| 4,882,668 A | 11/1989 | Schmid et al. | |
| 4,910,464 A | 3/1990 | Trett et al. | |
| 4,939,685 A | 7/1990 | Feintuch | |
| 5,001,486 A | 3/1991 | Bächtiger | |
| 5,012,254 A | 4/1991 | Thompson | |
| 5,034,906 A | 7/1991 | Chang | |
| 5,087,918 A | 2/1992 | May et al. | |
| 5,151,702 A | 9/1992 | Urkowitz | |
| 5,175,710 A | 12/1992 | Hutson | |
| 5,218,619 A | 6/1993 | Dent | |
| 5,272,663 A | 12/1993 | Jones et al. | |
| 5,280,288 A | 1/1994 | Sherry et al. | |
| 5,302,956 A | 4/1994 | Asbury et al. | |
| 5,341,141 A | 8/1994 | Frazier et al. | |
| 5,345,470 A | 9/1994 | Alexander | |
| 5,361,072 A | 11/1994 | Barrick et al. | |
| 5,376,939 A | 12/1994 | Urkowitz | |
| 5,379,322 A | 1/1995 | Kosaka et al. | |
| 5,497,162 A | 3/1996 | Kaiser | |
| 5,508,706 A | 4/1996 | Tsou et al. | |
| 5,581,464 A | 12/1996 | Woll et al. | |
| 5,654,715 A | 8/1997 | Hayashikura et al. | |
| 5,657,021 A | 8/1997 | Ehsani-Nategh et al. | |
| 5,657,023 A | 8/1997 | Lewis et al. | |
| 5,691,724 A | 11/1997 | Aker et al. | |
| 5,712,640 A | 1/1998 | Andou | |
| 5,724,041 A | 3/1998 | Inoue et al. | |
| 5,847,661 A | 12/1998 | Ricci | |
| 5,892,477 A | 4/1999 | Wehling | |
| 5,917,430 A | 6/1999 | Greneker, III et al. | |
| 5,920,285 A | 7/1999 | Beniamin | |
| 5,931,893 A | 8/1999 | Dent et al. | |
| 5,959,571 A | 9/1999 | Aoyagi et al. | |
| 5,970,400 A | 10/1999 | Dwyer | |
| 6,048,315 A | 4/2000 | Chiao et al. | |
| 6,067,314 A | 5/2000 | Azuma | |
| 6,069,581 A | 5/2000 | Bell et al. | |
| 6,121,872 A | 9/2000 | Weishaupt | |
| 6,121,918 A | 9/2000 | Tullsson | |
| 6,151,366 A | 11/2000 | Yip | |
| 6,163,252 A | 12/2000 | Nishiwaki | |
| 6,184,829 B1 | 2/2001 | Stilp | |
| 6,191,726 B1 | 2/2001 | Tullsson | |
| 6,208,248 B1 | 3/2001 | Ross | |
| 6,288,672 B1 | 9/2001 | Asano et al. | |
| 6,307,622 B1 | 10/2001 | Lewis | |
| 6,335,700 B1 | 1/2002 | Ashihara | |
| 6,347,264 B2 | 2/2002 | Nicosia et al. | |
| 6,400,308 B1 | 6/2002 | Bell et al. | |
| 6,411,250 B1 | 6/2002 | Oswald et al. | |
| 6,417,796 B1 | 7/2002 | Bowlds | |
| 6,424,289 B2 | 7/2002 | Fukae et al. | |
| 6,547,733 B2 | 4/2003 | Hwang et al. | |
| 6,583,753 B1 | 6/2003 | Reed | |
| 6,614,387 B1 | 9/2003 | Deadman | |
| 6,624,784 B1 | 9/2003 | Yamaguchi | |
| 6,674,908 B1 | 1/2004 | Aronov | |
| 6,683,560 B2 | 1/2004 | Bauhahn | |
| 6,693,582 B2 | 2/2004 | Steinlechner et al. | |
| 6,714,956 B1 | 3/2004 | Liu et al. | |
| 6,747,595 B2 | 6/2004 | Hirabe | |
| 6,768,391 B1 | 7/2004 | Dent et al. | |
| 6,865,218 B1 | 3/2005 | Sourour | |
| 6,888,491 B2 | 5/2005 | Richter | |
| 6,975,246 B1 | 12/2005 | Trudeau | |
| 7,066,886 B2 | 6/2006 | Song et al. | |
| 7,119,739 B1 | 10/2006 | Struckman | |
| 7,130,663 B2 | 10/2006 | Guo | |
| 7,202,776 B2 | 4/2007 | Breed | |
| 7,289,058 B2 | 10/2007 | Shima | |
| 7,299,251 B2 | 11/2007 | Skidmore et al. | |
| 7,338,450 B2 | 3/2008 | Kristoffersen et al. | |
| 7,395,084 B2 | 7/2008 | Anttila | |
| 7,460,055 B2 | 12/2008 | Nishijima et al. | |
| 7,474,258 B1 | 1/2009 | Arikan et al. | |
| 7,545,310 B2 | 6/2009 | Matsuoka | |
| 7,545,321 B2 | 6/2009 | Kawasaki | |
| 7,564,400 B2 | 7/2009 | Fukuda | |
| 7,567,204 B2 | 7/2009 | Sakamoto | |
| 7,609,198 B2 | 10/2009 | Chang | |
| 7,642,952 B2 | 1/2010 | Fukuda | |
| 7,663,533 B2 | 2/2010 | Toennesen | |
| 7,667,637 B2 | 2/2010 | Pedersen et al. | |
| 7,728,762 B2 | 6/2010 | Sakamoto | |
| 7,791,528 B2 | 9/2010 | Klotzbuecher | |
| 7,847,731 B2 | 12/2010 | Wiesbeck et al. | |
| 7,855,677 B2 | 12/2010 | Negoro et al. | |
| 7,859,450 B2 | 12/2010 | Shirakawa et al. | |
| 8,019,352 B2 | 9/2011 | Rappaport et al. | |
| 8,044,845 B2 | 10/2011 | Saunders | |
| 8,049,663 B2 | 11/2011 | Frank et al. | |
| 8,059,026 B1 | 11/2011 | Nunez | |
| 8,102,306 B2 | 1/2012 | Smith, Jr. et al. | |
| 8,115,672 B2 | 2/2012 | Nouvel et al. | |
| 8,154,436 B2 | 4/2012 | Szajnowski | |
| 8,169,359 B2 | 5/2012 | Aoyagi | |
| 8,212,713 B2 | 7/2012 | Aiga et al. | |
| 8,330,650 B2 | 12/2012 | Goldman | |
| 8,390,507 B2 | 3/2013 | Wintermantel | |
| 8,471,760 B2 | 6/2013 | Szajnowski | |
| 8,532,159 B2 | 9/2013 | Kagawa et al. | |
| 8,547,988 B2 | 10/2013 | Hadani et al. | |
| 8,686,894 B2 | 4/2014 | Fukuda et al. | |
| 8,694,306 B1 | 4/2014 | Short et al. | |
| 8,994,581 B1 | 3/2015 | Brown | |
| 9,020,011 B1* | 4/2015 | Hiebert | H04B 17/20 375/150 |
| 9,121,943 B2 | 9/2015 | Stirling-Gallacher et al. | |
| 9,239,378 B2 | 1/2016 | Kishigami et al. | |
| 9,239,379 B2 | 1/2016 | Burgio et al. | |
| 9,274,217 B2 | 3/2016 | Chang et al. | |
| 9,282,945 B2 | 3/2016 | Smith et al. | |
| 9,335,402 B2 | 5/2016 | Maeno et al. | |
| 9,400,328 B2 | 7/2016 | Hsiao et al. | |
| 9,541,639 B2 | 1/2017 | Searcy et al. | |
| 9,568,600 B2 | 2/2017 | Alland | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,720,073 B1 | 8/2017 | Davis et al. | |
| 9,720,080 B1 | 9/2017 | Rodenbeck | |
| 9,753,121 B1 | 9/2017 | Davis | |
| 9,753,132 B1 | 9/2017 | Bordes et al. | |
| 9,772,397 B1 | 9/2017 | Bordes et al. | |

(56) References Cited

U.S. PATENT DOCUMENTS

| | | | |
|---|---|---|---|
| 9,791,551 B1 | 10/2017 | Eshraghi et al. | |
| 9,791,564 B1 | 10/2017 | Harris et al. | |
| 9,806,914 B1 | 10/2017 | Bordes et al. | |
| 9,829,567 B1 | 11/2017 | Davis et al. | |
| 9,846,228 B2 | 12/2017 | Davis et al. | |
| 9,869,762 B1 | 1/2018 | Alland et al. | |
| 10,092,192 B2 | 10/2018 | Lashkari et al. | |
| 10,305,611 B1* | 5/2019 | Rimini | G01S 13/343 |
| 11,271,328 B2* | 3/2022 | Liu | H01Q 5/35 |
| 2001/0002919 A1 | 6/2001 | Sourour et al. | |
| 2002/0004692 A1 | 1/2002 | Nicosia et al. | |
| 2002/0044082 A1 | 4/2002 | Woodington et al. | |
| 2002/0075178 A1 | 6/2002 | Woodington et al. | |
| 2002/0118522 A1 | 8/2002 | Ho et al. | |
| 2002/0130811 A1 | 9/2002 | Voigtlaender | |
| 2002/0147534 A1 | 10/2002 | Delcheccolo et al. | |
| 2002/0155811 A1 | 10/2002 | Prismantas | |
| 2003/0001772 A1 | 1/2003 | Woodington et al. | |
| 2003/0011519 A1 | 1/2003 | Breglia et al. | |
| 2003/0058166 A1 | 3/2003 | Hirabe | |
| 2003/0073463 A1 | 4/2003 | Shapira | |
| 2003/0080713 A1 | 5/2003 | Kirmuss | |
| 2003/0102997 A1 | 6/2003 | Levin et al. | |
| 2003/0235244 A1 | 12/2003 | Pessoa et al. | |
| 2004/0012516 A1 | 1/2004 | Schiffmann | |
| 2004/0015529 A1 | 1/2004 | Tanrikulu et al. | |
| 2004/0066323 A1 | 4/2004 | Richter | |
| 2004/0070532 A1 | 4/2004 | Ishii et al. | |
| 2004/0107030 A1 | 6/2004 | Nishira et al. | |
| 2004/0138802 A1 | 7/2004 | Kuragaki et al. | |
| 2004/0215373 A1 | 10/2004 | Won et al. | |
| 2005/0008065 A1 | 1/2005 | Schilling | |
| 2005/0069162 A1 | 3/2005 | Haykin | |
| 2005/0090274 A1 | 4/2005 | Miyashita | |
| 2005/0156780 A1 | 7/2005 | Bonthron et al. | |
| 2005/0201457 A1 | 9/2005 | Allred et al. | |
| 2005/0225476 A1 | 10/2005 | Hoetzel et al. | |
| 2005/0273480 A1 | 12/2005 | Pugh et al. | |
| 2006/0012511 A1 | 1/2006 | Dooi et al. | |
| 2006/0036353 A1 | 2/2006 | Wintermantel | |
| 2006/0050707 A1 | 3/2006 | Sterin | |
| 2006/0093078 A1 | 5/2006 | Lewis et al. | |
| 2006/0109170 A1 | 5/2006 | Voigtlaender | |
| 2006/0109931 A1 | 5/2006 | Asai | |
| 2006/0114324 A1 | 6/2006 | Farmer et al. | |
| 2006/0140249 A1 | 6/2006 | Kohno | |
| 2006/0181448 A1 | 8/2006 | Natsume et al. | |
| 2006/0220943 A1 | 10/2006 | Schlick et al. | |
| 2006/0244653 A1 | 11/2006 | Szajnowski | |
| 2006/0262007 A1 | 11/2006 | Bonthron | |
| 2006/0262009 A1 | 11/2006 | Watanabe | |
| 2007/0018884 A1 | 1/2007 | Adams | |
| 2007/0018886 A1 | 1/2007 | Watanabe et al. | |
| 2007/0096885 A1 | 5/2007 | Cheng et al. | |
| 2007/0109175 A1 | 5/2007 | Fukuda | |
| 2007/0115869 A1 | 5/2007 | Lakkis | |
| 2007/0120731 A1 | 5/2007 | Kelly, Jr. et al. | |
| 2007/0132633 A1 | 6/2007 | Uchino | |
| 2007/0152870 A1 | 7/2007 | Woodington et al. | |
| 2007/0152871 A1 | 7/2007 | Puglia | |
| 2007/0152872 A1 | 7/2007 | Woodington | |
| 2007/0164896 A1 | 7/2007 | Suzuki et al. | |
| 2007/0171122 A1 | 7/2007 | Nakano | |
| 2007/0182619 A1 | 8/2007 | Honda et al. | |
| 2007/0182623 A1 | 8/2007 | Zeng | |
| 2007/0188373 A1 | 8/2007 | Shirakawa et al. | |
| 2007/0200747 A1 | 8/2007 | Okai | |
| 2007/0263748 A1 | 11/2007 | Mesecher | |
| 2007/0279303 A1 | 12/2007 | Schoebel | |
| 2008/0080599 A1 | 4/2008 | Kang et al. | |
| 2008/0088499 A1 | 4/2008 | Bonthron | |
| 2008/0094274 A1 | 4/2008 | Nakanishi | |
| 2008/0150790 A1 | 6/2008 | Voigtlaender et al. | |
| 2008/0180311 A1 | 7/2008 | Mikami | |
| 2008/0208472 A1 | 8/2008 | Morcom | |
| 2008/0218406 A1 | 9/2008 | Nakanishi | |
| 2008/0258964 A1 | 10/2008 | Schoeberl | |
| 2008/0272955 A1 | 11/2008 | Yonak et al. | |
| 2009/0003412 A1 | 1/2009 | Negoro et al. | |
| 2009/0015459 A1 | 1/2009 | Mahler et al. | |
| 2009/0015464 A1 | 1/2009 | Fukuda | |
| 2009/0027257 A1 | 1/2009 | Arikan | |
| 2009/0046000 A1 | 2/2009 | Matsuoka | |
| 2009/0051581 A1 | 2/2009 | Hatono | |
| 2009/0072957 A1 | 3/2009 | Wu et al. | |
| 2009/0073025 A1 | 3/2009 | Inoue et al. | |
| 2009/0074031 A1 | 3/2009 | Fukuda | |
| 2009/0079617 A1 | 3/2009 | Shirakawa et al. | |
| 2009/0085827 A1 | 4/2009 | Orime et al. | |
| 2009/0103593 A1 | 4/2009 | Bergamo | |
| 2009/0121918 A1 | 5/2009 | Shirai et al. | |
| 2009/0212998 A1 | 8/2009 | Szajnowski | |
| 2009/0232510 A1* | 9/2009 | Gupta | H04L 27/2096 375/296 |
| 2009/0237293 A1 | 9/2009 | Sakuma | |
| 2009/0254260 A1 | 10/2009 | Nix et al. | |
| 2009/0267822 A1 | 10/2009 | Shinoda et al. | |
| 2009/0289831 A1 | 11/2009 | Akita | |
| 2009/0295623 A1 | 12/2009 | Falk | |
| 2010/0001897 A1 | 1/2010 | Lyman | |
| 2010/0019950 A1 | 1/2010 | Yamano et al. | |
| 2010/0039311 A1 | 2/2010 | Woodington et al. | |
| 2010/0116365 A1 | 5/2010 | McCarty | |
| 2010/0156690 A1 | 6/2010 | Kim et al. | |
| 2010/0198513 A1 | 8/2010 | Zeng et al. | |
| 2010/0253573 A1 | 10/2010 | Holzheimer et al. | |
| 2010/0277359 A1 | 11/2010 | Ando | |
| 2010/0289692 A1 | 11/2010 | Winkler | |
| 2011/0006944 A1 | 1/2011 | Goldman | |
| 2011/0032138 A1 | 2/2011 | Krapf | |
| 2011/0074620 A1 | 3/2011 | Wintermantel | |
| 2011/0187600 A1 | 8/2011 | Landt | |
| 2011/0196568 A1 | 8/2011 | Nickolaou | |
| 2011/0234448 A1 | 9/2011 | Hayase | |
| 2011/0248796 A1 | 10/2011 | Pozgay | |
| 2011/0279303 A1 | 11/2011 | Smith, Jr. et al. | |
| 2011/0279307 A1 | 11/2011 | Song | |
| 2011/0285576 A1 | 11/2011 | Lynam | |
| 2011/0291874 A1 | 12/2011 | De Mersseman | |
| 2011/0291875 A1 | 12/2011 | Szajnowski | |
| 2011/0292971 A1 | 12/2011 | Hadani et al. | |
| 2011/0298653 A1 | 12/2011 | Mizutani | |
| 2012/0001791 A1 | 1/2012 | Wintermantel | |
| 2012/0050093 A1 | 3/2012 | Heilmann et al. | |
| 2012/0105268 A1 | 5/2012 | Smits et al. | |
| 2012/0112957 A1 | 5/2012 | Nguyen et al. | |
| 2012/0133547 A1 | 5/2012 | MacDonald et al. | |
| 2012/0173246 A1 | 7/2012 | Choi et al. | |
| 2012/0195349 A1 | 8/2012 | Lakkis | |
| 2012/0249356 A1 | 10/2012 | Shope | |
| 2012/0257643 A1 | 10/2012 | Wu et al. | |
| 2012/0314799 A1 | 12/2012 | In De Betou et al. | |
| 2012/0319900 A1 | 12/2012 | Johansson et al. | |
| 2013/0016761 A1 | 1/2013 | Nentwig | |
| 2013/0021196 A1 | 1/2013 | Himmelstoss | |
| 2013/0027240 A1 | 1/2013 | Chowdhury | |
| 2013/0057436 A1 | 3/2013 | Krasner et al. | |
| 2013/0069818 A1 | 3/2013 | Shirakawa et al. | |
| 2013/0102254 A1 | 4/2013 | Cyzs | |
| 2013/0113647 A1 | 5/2013 | Sentelle et al. | |
| 2013/0113652 A1 | 5/2013 | Smits et al. | |
| 2013/0113653 A1 | 5/2013 | Kishigami et al. | |
| 2013/0135140 A1 | 5/2013 | Kishigami | |
| 2013/0169468 A1 | 7/2013 | Johnson et al. | |
| 2013/0169485 A1 | 7/2013 | Lynch | |
| 2013/0176154 A1 | 7/2013 | Bonaccio et al. | |
| 2013/0214961 A1 | 8/2013 | Lee et al. | |
| 2013/0229301 A1 | 9/2013 | Kanamoto | |
| 2013/0244710 A1 | 9/2013 | Nguyen et al. | |
| 2013/0249730 A1 | 9/2013 | Adcook | |
| 2013/0314271 A1 | 11/2013 | Braswell et al. | |
| 2013/0321196 A1 | 12/2013 | Binzer et al. | |
| 2014/0022108 A1 | 1/2014 | Alberth, Jr. et al. | |
| 2014/0028491 A1 | 1/2014 | Ferguson | |

(56) References Cited

U.S. PATENT DOCUMENTS

| | | |
|---|---|---|
| 2014/0035774 A1 | 2/2014 | Khlifi |
| 2014/0049423 A1 | 2/2014 | De Jong et al. |
| 2014/0070985 A1 | 3/2014 | Vacanti |
| 2014/0085128 A1 | 3/2014 | Kishigami et al. |
| 2014/0097987 A1 | 4/2014 | Worl et al. |
| 2014/0111367 A1 | 4/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0253364 A1 | 9/2014 | Lee et al. |
| 2014/0285373 A1 | 9/2014 | Kuwahara et al. |
| 2014/0316261 A1 | 10/2014 | Lux et al. |
| 2014/0327566 A1 | 11/2014 | Burgio et al. |
| 2014/0340254 A1 | 11/2014 | Hesse |
| 2014/0348253 A1 | 11/2014 | Mobasher et al. |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0153445 A1 | 6/2015 | Jansen |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1 | 7/2015 | Kuehnle et al. |
| 2015/0226848 A1 | 8/2015 | Park |
| 2015/0234045 A1 | 8/2015 | Rosenblum |
| 2015/0247924 A1 | 9/2015 | Kishigami |
| 2015/0255867 A1 | 9/2015 | Inoue |
| 2015/0280893 A1* | 10/2015 | Choi .................. H04L 5/14 370/281 |
| 2015/0301172 A1 | 10/2015 | Ossowska |
| 2015/0323660 A1 | 11/2015 | Hampikian |
| 2015/0331090 A1 | 11/2015 | Jeong et al. |
| 2015/0333847 A1* | 11/2015 | Bharadia ............ H04B 15/00 455/63.1 |
| 2015/0369912 A1 | 12/2015 | Kishigami et al. |
| 2016/0003938 A1 | 1/2016 | Gazit et al. |
| 2016/0003939 A1 | 1/2016 | Stainvas Olshansky et al. |
| 2016/0018511 A1 | 1/2016 | Nayyar et al. |
| 2016/0025844 A1 | 1/2016 | Mckitterick et al. |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0054441 A1 | 2/2016 | Kuo et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1 | 4/2016 | Pavao-Moreira et al. |
| 2016/0124075 A1 | 5/2016 | Vogt et al. |
| 2016/0124086 A1 | 5/2016 | Jansen et al. |
| 2016/0131752 A1 | 5/2016 | Jansen et al. |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0178732 A1 | 6/2016 | Oka et al. |
| 2016/0213258 A1 | 7/2016 | Lashkari et al. |
| 2016/0238694 A1 | 8/2016 | Kishigami |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburai et al. |
| 2017/0074980 A1 | 3/2017 | Adib |
| 2017/0117950 A1 | 4/2017 | Strong |
| 2017/0153316 A1 | 6/2017 | Wintermantel |
| 2017/0219689 A1 | 8/2017 | Hung et al. |
| 2017/0234968 A1 | 8/2017 | Roger et al. |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0309997 A1 | 10/2017 | Aliand et al. |
| 2017/0310758 A1 | 10/2017 | Davis et al. |
| 2017/0336495 A1 | 11/2017 | Davis et al. |
| 2018/0175907 A1 | 1/2018 | Marr |
| 2018/0074168 A1 | 3/2018 | Subburaj et al. |
| 2018/0115371 A1* | 4/2018 | Trotta .................. H04B 1/38 |
| 2019/0379386 A1* | 12/2019 | Chi ..................... H03L 7/185 |
| 2020/0191939 A1* | 6/2020 | Wu ..................... G01S 7/354 |

FOREIGN PATENT DOCUMENTS

| | | | |
|---|---|---|---|
| EP | 2821808 | 7/2015 | |
| FR | 2751086 | 1/1998 | |
| WO | WO-2013147948 A2 * | 10/2013 | ......... G01S 13/0209 |
| WO | WO2015175078 | 11/2015 | |
| WO | WO2015185058 | 12/2015 | |
| WO | WO2016011407 | 1/2016 | |
| WO | WO2016030656 | 3/2016 | |
| WO | WO2017175190 | 10/2017 | |
| WO | WO2017187330 | 11/2017 | |

OTHER PUBLICATIONS

Chambers et al., "An article entitled Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014, (Year: 2014).

Oscar Faus García," Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

International Search Report and Written Opinion of corresponding PCT Application No. PCT/IB2020/052159, dated Jul. 15, 2020.

* cited by examiner

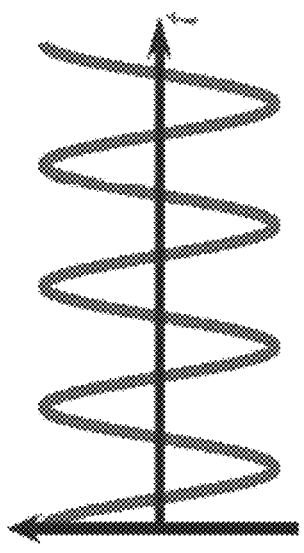
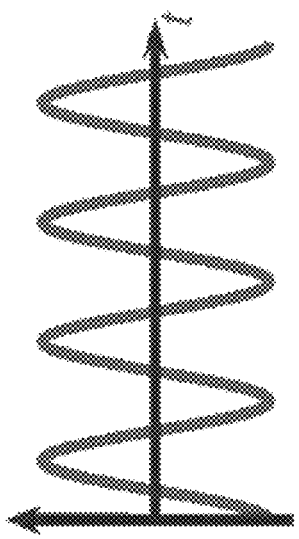
FIG. 3

Baseband and IF Signal Spectra

Zero-IF Spectra of Analog Filter I/O

Zero-IF Spectra of Digital Filter I/O

Low-IF Spectra of Analog Filter I/O

Low-IF Spectra of Digital Filter I/O

Example Correlator Output

Example Beam-Forming Output

Example Doppler FFT Output: 0-IF

Example Beam-Forming Output: 0-IF

METHOD AND APPARATUS FOR MITIGATION OF LOW FREQUENCY NOISE IN RADAR SYSTEMS

CROSS REFERENCE TO RELATED APPLICATIONS

The present application claims the filing benefits of U.S. provisional application, Ser. No. 62/816,941, filed Mar. 12, 2019, which is hereby incorporated by reference herein in its entirety.

FIELD OF THE INVENTION

The present invention is directed to radar systems, and in particular to radar system transmitters and receivers.

BACKGROUND OF THE INVENTION

The use of radar to determine location and velocity of objects in an environment is important in a number of applications including, for example, automotive radar, industrial processes, and gesture detection. A radar system typically transmits radio signals and listens for the reflection of the radio signals from objects in the environment. By comparing the transmitted radio signals with the received radio signals, a radar system can determine the distance to an object, and the velocity of the object. Using multiple transmitters and/or receivers, or a movable transmitter or receiver, the location (angle) of an object can also be determined.

SUMMARY OF THE INVENTION

Embodiments of the present invention provide methods and a system for improving performance of a radar system that is affected by low frequency noise in the received signal. Such low frequency noise may include DC offset and/or flicker noise introduced by components of the radar system itself. Embodiments of the present invention provide better detectability of small objects and more accurate estimation of the distance, velocity, and position of all objects, by redistributing the signal power to frequencies separated from the low frequency noise, and by using filters to suppress the power of the low frequency noise without substantially suppressing the desired signal.

A radar system in accordance with an embodiment of the present invention includes a transmitter and receiver. The transmitter is configured to transmit a modulated radio signal. The transmitter is configured to up-convert a first baseband signal to a selected first intermediate frequency (IF) signal before up-converting the first IF signal to a selected radio frequency (RF) frequency of the transmitted radio signal. Up-converting a signal increases a frequency of the signal. Up-converting the first baseband signal to the first IF signal shifts a signal energy to a frequency of the first IF signal. The receiver is configured to receive the radio signals transmitted by the transmitter and reflected from objects in an environment. The receiver is configured to down-convert the received radio signal to a second IF signal. Down-converting a signal decreases a frequency of the signal. The receiver is further configured to down-convert the second IF signal to a second baseband signal for further processing to determine at least one of a distance, velocity and position of objects in the environment.

Another radar system in accordance with an embodiment of the present invention includes a transmitter and a receiver. The transmitter is configured to transmit a modulated radio signal. The transmitter includes a symbol generator and an inverse DFT. The symbol generator is configured to produce symbol values of only zeros or complex values with a reduced weighting for samples corresponding to frequencies at or near DC, such that the symbols passed through the inverse DFT produce a first baseband signal that is DC free and with low power signal energy at low frequencies that may be affected by flicker noise. The receiver is configured to receive the radio signals transmitted by the transmitter and reflected from objects in an environment. The receiver is configured to down-convert the received radio signal to a second baseband signal for further processing to determine at least one of a distance, velocity and position of objects in the environment.

Yet another radar system in accordance with an embodiment of the present invention includes a transmitter, a receiver, and an IF mixer. The transmitter is configured to transmit a modulated radio signal. The transmitter is configured to up-convert a first baseband signal to a selected first intermediate frequency (IF) signal before the first IF signal is up-converted to a selected radio frequency (RF) frequency of the transmitted radio signal. Up-converting the first baseband signal to the first IF signal shifts a signal energy to a frequency of the first IF signal. The receiver is configured to receive the radio signals transmitted by the transmitter and reflected from objects in an environment, and is configured to process the received radio signals to determine at least one of a distance, velocity, and position of objects in the environment. The IF mixer is configured to up-convert the first baseband signal to the first IF signal, and further configured to down-convert the received radio signal to a second IF signal. The receiver is operable to amplify and/or filter the second IF. The receiver is further configured to down-convert the second IF signal to a second baseband signal for further processing to determine the at least one of distance, velocity and position of objects in the environment.

In an aspect of the present invention, the redistribution of transmitted power over frequency is accomplished by using a heterodyne radio architecture for the radio transmitter and/or for the radio receiver.

In another aspect of the present invention, in a heterodyne radio transmitter architecture, the baseband (modulating) signal to be transmitted is first frequency shifted to an intermediate frequency (IF) and then frequency shifted again (optionally frequency shifted more than once) to the intended radio frequency (RF). For spectral efficiency, the IF signal may be considered to be a complex signal (having I and Q components) even if the baseband signal was real-valued, and the frequency shifting in this case can be performed using a quadrature mixer. This results in a single-side-band signal for transmission.

In yet another aspect of the present invention, in a heterodyne radio receiver architecture, the radio frequency (RF) signal is first frequency shifted to an intermediate frequency (IF) and then frequency shifted again (optionally frequency shifted more than once) to become a baseband signal. In another aspect of the present invention, the frequency shifts are performed using quadrature mixers utilizing a complex (I and Q) signal representation of the IF signals (optionally also the baseband signals) for image rejection purposes.

In a further aspect of the present invention, the heterodyne embodiment of the present invention is designed such that the most problematic non-ideal components (i.e., those which cause the most DC offset and flicker noise) operate on the RF or IF signal instead of operating on the baseband signal. The intermediate frequency (IF) is chosen so that the noise power of the non-ideal components is predominantly separated in frequency from the power of the desired signal.

By choosing the intermediate frequency (IF) of an exemplary heterodyne radar receiver to be a relatively low frequency (compared to the RF), the bandwidth requirements of the IF portion of the receiver are reduced, and this can facilitate a design where the receiver's IF signal is digitized using an analog-to-digital converter (ADC), and subsequent signal processing operations, such as mixing to baseband and filtering, can be performed numerically, using digital logic circuits. The IF only need be sufficiently high to adequately separate the signal power spectrum from the DC offset and flicker noise spectrum.

By choosing the intermediate frequency (IF) of a heterodyne radar transmitter to be a relatively low frequency (compared to the RF), the bandwidth requirements of the IF portion of the transmitter are reduced, and this can facilitate a design where the transmitter's IF signal is calculated numerically from the baseband signal using digital logic circuits to perform the mixing operation and optional filtering operations. Then the digital IF signal can be converted to the analog domain using an analog-to-digital converter (ADC), and then frequency shifted to RF. As with the heterodyne receiver, the IF only need be sufficiently high to adequately separate the signal power spectrum from the DC offset and flicker noise spectrum of the transmitter path components. A key advantage of such a digital implementation of the baseband filtering and the IF mixer of the transmitter is that they are not subject to the DC offsets and flicker noise that would tend to be generated if the processing were performed using CMOS analog circuits.

The choice of IF frequencies can be made independently in a radar system's receiver and its transmitter, or they can be chosen to be equal. If the IF frequencies are equal, the RF local oscillator (RFLO) can be shared between the transmitter and the receiver, which provides a significant advantage in both cost and radar system performance.

In an aspect of the present invention, when an IF is chosen low enough to facilitate digital implementation of the IF section, while still being high enough to adequately separate the signal spectrum from the low-frequency noise spectrum and DC offset, the radar system is considered to have a digital low-IF architecture (of its transmitter path, or of its receiver path, or both).

In an aspect of the present invention, the modulation is based on Orthogonal Frequency Division Modulation (OFDM), in which the baseband signal to be transmitted is produced via an inverse Fourier transform (IFT) on a sequence of symbols to be transmitted. In a further aspect of the present invention, the portion of each symbol which represents DC and low frequencies is set to zero, or the DC and low frequencies can be deemphasized by a weighting function, prior to the IFT. In another aspect of the present invention, the receiver path of an OFDM radio system discards, or by weighting de-emphasizes, the recovered DC offset and low frequency symbols portions of each symbol.

These and other objects, advantages, purposes and features of the present invention will become apparent upon review of the following specification in conjunction with the drawings.

BRIEF DESCRIPTION OF THE DRAWINGS

FIG. 3 is an illustration of binary phase modulation;

DESCRIPTION OF THE PREFERRED EMBODIMENTS

Figure 1:
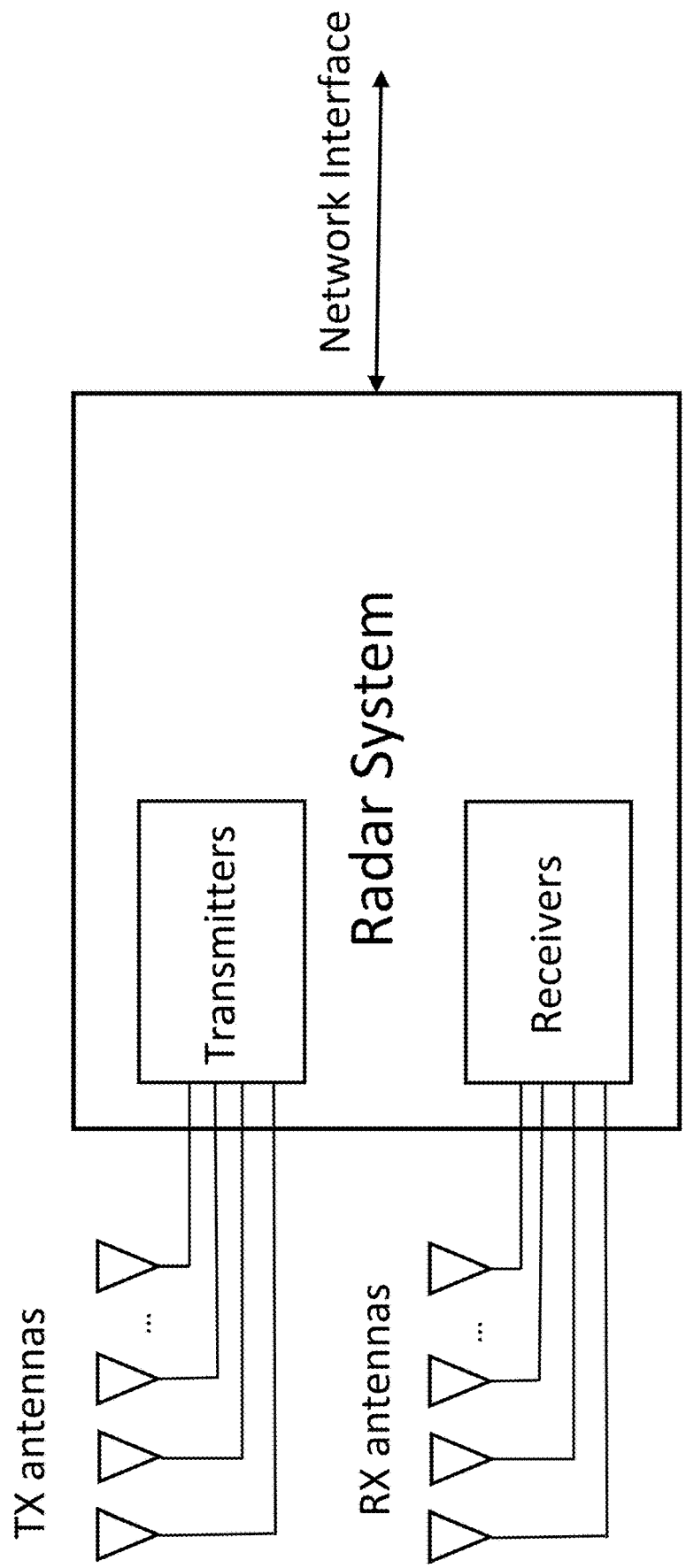
FIG. 1 is a block diagram illustrating a radar system with a plurality of receivers and a plurality of transmitters in accordance with the present invention.

The present invention will now be described with reference to the accompanying figures, wherein numbered elements in the following written description correspond to like-numbered elements in the figures. Methods and systems of the present invention result in better performance from a radar system. An exemplary radar system utilizes one or more transmit (TX) antennas to transmit signals as illustrated in FIG. 1. These signals are reflected from objects (also known as targets) in the environment and received by one or more receive (RX) antennas of the radar system, also illustrated in FIG. 1. The radar system also has one or more interfaces to other systems. For example, the network interfaces may include Ethernet, USB, or in an automotive radar system may include CAN-FD and/or FlexRay. There may also be processing capability contained in the radar system apart from the transmitters and receivers.

There are several types of signals used in different types of radar systems. One type of radar signal is known as a frequency-modulated continuous waveform (FMCW). In an FMCW radar system, the transmitter of the radar system sends a continuous radio frequency (RF) signal in which the frequency of the signal varies over time. This is sometimes called a chirp radar system. Mixing (multiplying) the reflected wave from an object with a replica of the transmitted signal results in a baseband CW signal with a frequency that represents the distance between the radar transmitter/receiver and the object. The Doppler frequency, and hence the relative radial velocity of the reflecting object, can be determined in FMCW radar systems in a number of different ways: for example, by sweeping up in frequency and then down in frequency.

Another type of radar signal is known as a phase-modulated continuous waveform (PMCW). For this type of radio signal, the phase of the transmitted RF signal is modulated according to a certain pattern or code, sometimes called a spreading code. The transmitted signal is phase modulated by mixing a baseband signal (e.g., with two values +1 and −1) with a local oscillator to generate a transmitted signal with a phase that changes corresponding to the baseband signal (e.g., +1 corresponding to a phase of 0 radians and −1 corresponding to a phase of p radians). A sequence of phase values forms the spreading code. The rate at which the phase is modulated determines the bandwidth of the transmitted signal and is called the chip rate. In a PMCW radar system, the receiver typically performs correlations of the received signal with time-delayed versions of the transmitted signal and looks for peaks in the correlation as a function of the time-delay, also known as correlation lag. The correlation lag of the transmitted signal that yields a peak in the correlation corresponds to the delay of the transmitted signal when reflected off an object. The round-trip distance to the object is found by multiplying that delay (correlation lag) by the speed of light. The Doppler frequency, and hence the relative radial velocity of the reflecting object, can be determined in PMCW radar systems by various means to measure the frequency offset of the reflected signal, typically by using a Fourier transform of the correlation signal over a suitably chosen time interval.

A radar system may also be built using Orthogonal Frequency Division Modulation (OFDM), in which an inverse discrete time Fourier transform is performed on a group of code symbols drawn from a signal constellation (such as, for example 64-QAM). The output of the inverse Fourier transform is then upconverted to the desired radio frequency for transmission.

Determining the direction of a detected object can be done when using any of these modulation methods by utilizing multiple or moving (e.g., rotating) antennas.

The baseband signal of a radar system is the signal which controls the modulation of the RF carrier sinewave, via the chosen modulation method. As described above, the baseband signal may be used in different ways to modulate the carrier, such as FMCW, PMCW, OFDM, or other modulation methods. Typically, the power spectrum of this baseband signal is centered near zero frequency (DC). In many modulation methods, the baseband signal is mathematically considered to be a complex signal with a real (In-Phase, I) component and an imaginary (Quadrature, Q) component, and as such need not necessarily have a frequency spectrum which is symmetric around zero frequency (DC).

A radar system may contain components whose behavior is not ideal. For example, some electronic components generate noise that is added to the desired signal and some exhibit nonlinear behavior which introduces distortion into the signal waveform.

An example of non-ideal component behavior is that some radar components generate a constant-valued offset (DC offset) which is added to the desired baseband signal, either in the transmitter signal path, in the receiver signal path, or both. The use of CMOS transistor based analog electronic circuits can lead to such non-ideal radar system components, in part because they tend to generate a type of noise known as flicker noise, or 1/f noise, which consists of DC offset and a slowly varying (i.e., low frequency) offset whose noise power is most concentrated close to DC. Such non-ideal component behavior may cause the radar system's estimated range, velocity and direction of detected objects to be significantly in error, and/or it may degrade the radar's sensitivity (ability to detect small or low reflectance objects). The exact nature of the errors and degradations depend on the radar system's modulation method.

In spite of their non-ideal behavior, the use of CMOS analog circuits in radars is highly desirable because they are typically manufactured in a less expensive process than many other types of electronics, resulting in lower product cost. Thus, there is a need for radar systems that can be manufactured using less expensive components, such as CMOS analog circuits, with modulation methods chosen as appropriate for the other design goals of the radar system, while mitigating the non-ideal behavioral characteristics of those circuits such as DC offset and flicker noise.

The radar sensing system of the present invention may utilize aspects of the radar systems described in U.S. Pat. Nos. 10,261,179; 9,971,020; 9,954,955; 9,945,935; 9,869, 762; 9,846,228; 9,806,914; 9,791,564; 9,791,551; 9,772, 397; 9,753,121; 9,689,967; 9,599,702; 9,575,160, and/or 9,689,967; and/or U.S. Publication Nos. US-2017-0309997; and/or U.S. patent application Ser. No. 16/674,543, filed Nov. 5, 2019, Ser. No. 16/259,474, filed Jan. 28, 2019, Ser. No. 16/220,121, filed Dec. 14, 2018, Ser. No. 15/496,038, filed Apr. 25, 2017, Ser. No. 15/689,273, filed Aug. 29, 2017, Ser. No. 15/893,021, filed Feb. 9, 2018, and/or Ser. No. 15/892,865, filed Feb. 9, 2018, and/or U.S. provisional application, Ser. No. 62/816,941, filed Mar. 12, 2019, which are all hereby incorporated by reference herein in their entireties.

Figure 12:
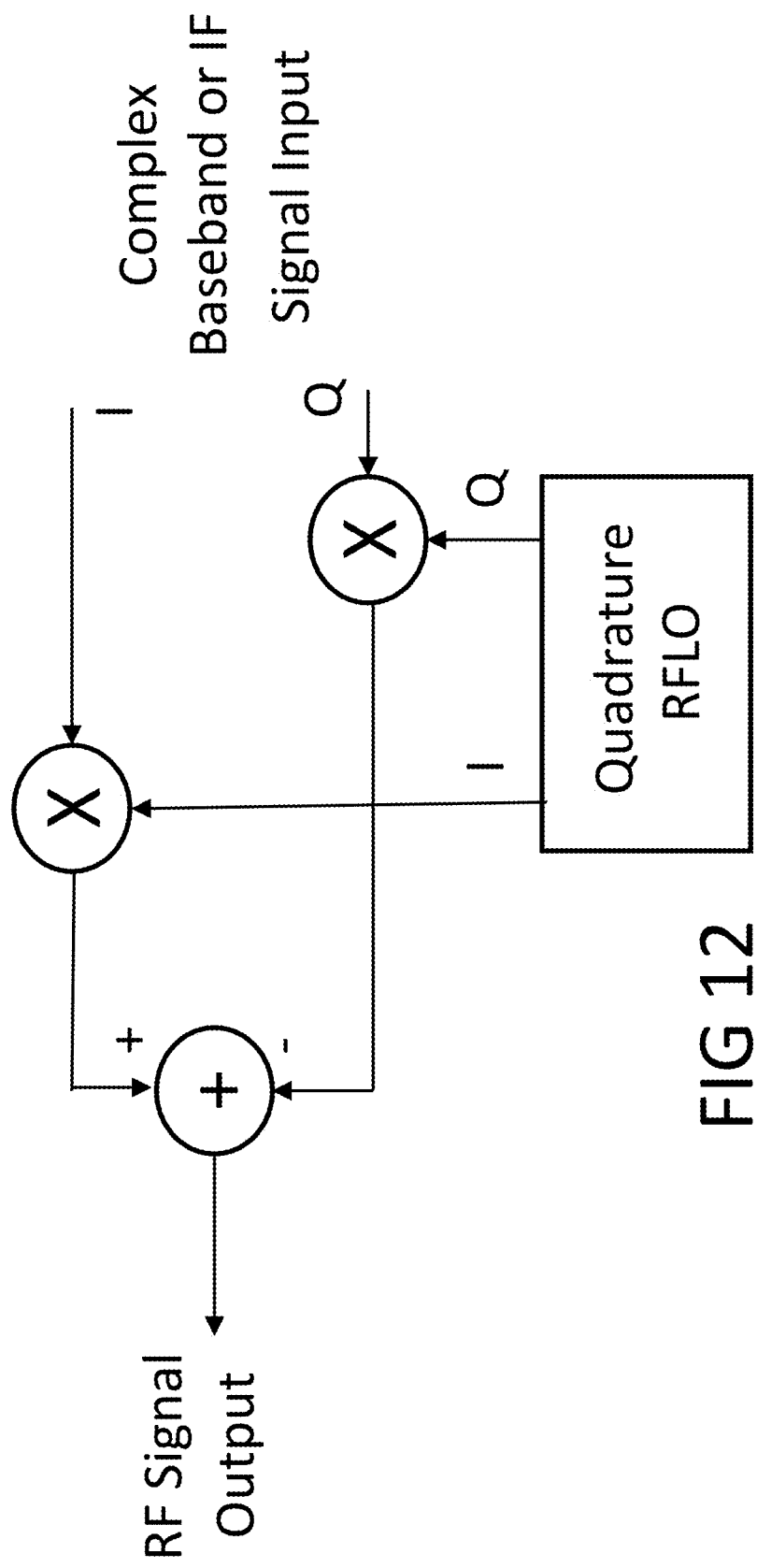
FIG. 12 is a block diagram for a quadrature mixer to up-convert a signal from baseband or IF to radio frequency (RF) according to an embodiment of the present invention.

The transmitted radio signal from each radar transmit antenna in FIG. 1 is generated by upconverting a baseband signal to a radio frequency (RF) signal. The up-conversion operation may be performed by mixing the baseband signal with an RF local oscillator (RFLO) signal at a carrier frequency, as shown in the Quadrature RF Mixer illustrated in FIG. 5, and whose details are shown in FIG. 12. In general, each transmit antenna may have its own baseband signal, and its own up-conversion, amplification, and filtering, although in some cases the same baseband signal may be used for more than one transmit antenna.

Figure 2:
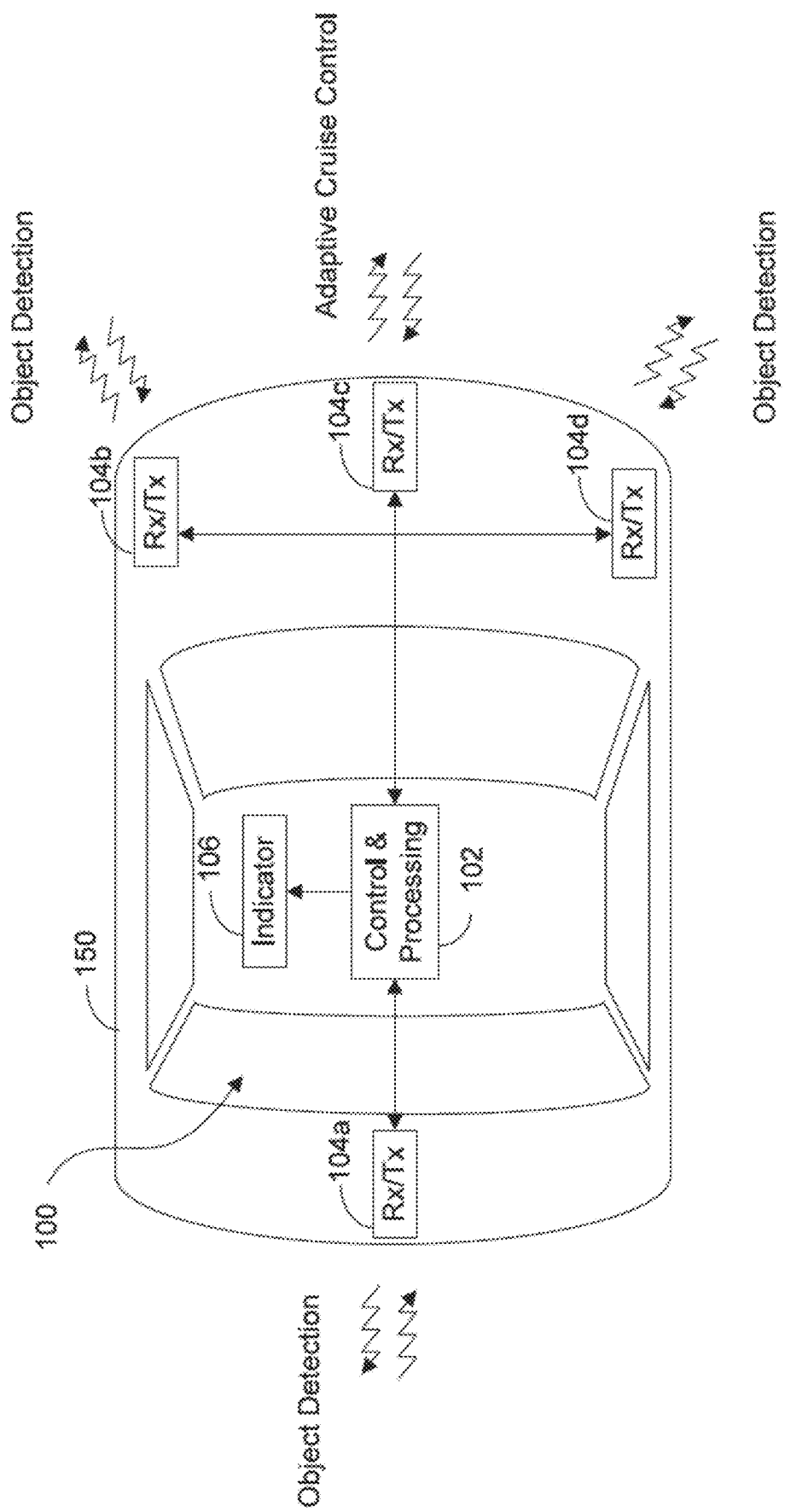
FIG. 2 is a plan view of an automobile equipped with radar systems in accordance with the present invention.

FIG. 2 illustrates an exemplary radar system 100 configured for use in a vehicle 150. In an embodiment of the present invention, a vehicle 150 may be an automobile, truck, or bus, etc. As illustrated in FIG. 2, the radar system 100 may comprise one or more groups of transmitters and one or more groups of receivers 104a-104d. Other configurations are also possible. As illustrated in FIG. 2, the radar system may also comprise a control and processing module 102 and an indicator 106. Other configurations are also possible. FIG. 2 illustrates the receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

The baseband signal to be used for transmission by a transmit antenna of the radar system might be phase modulated using a series of binary codes. When phase modulation is used, such a system is often referred to as a Phase Modulated Continuous Wave (PMCW) radar system. FIG. 3 illustrates the basic waveforms of a binary PMCW radar. A sinusoidal signal is generated whose phase depends on binary codes of the baseband signal. In this example, the phase is 0 degrees or 180 degrees. This also corresponds to transmitting a signal or the opposite of that signal when the binary baseband chip is a 0 or a 1. More than two phases could be used if the baseband signal is not binary.

Figure 4:
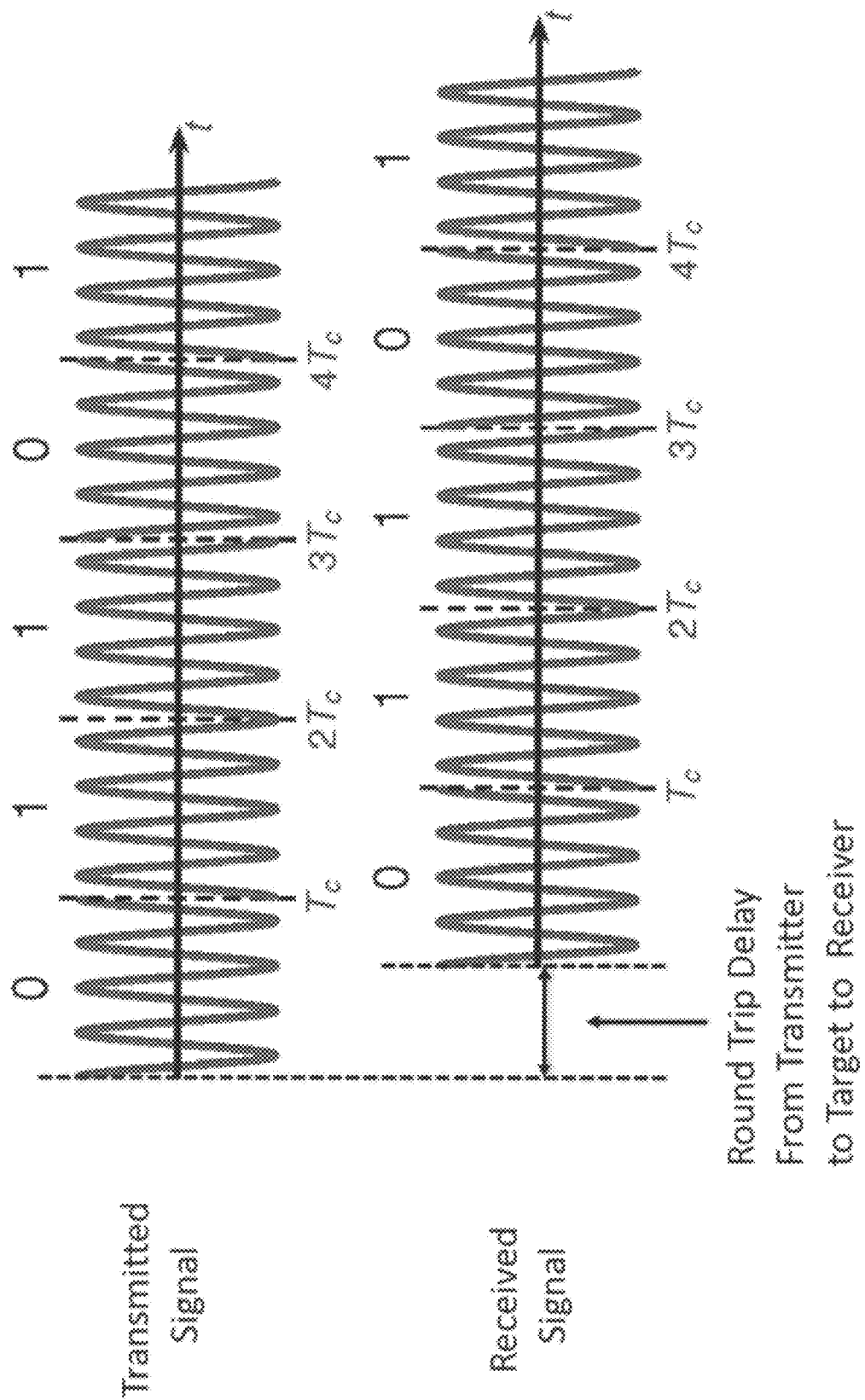
FIG. 4 illustrates how a sequence of binary chips combine to form a binary phase modulated signal.

Each code bit (also referred to as a chip) controls the phase of the transmitted radio signal as shown in FIG. 3 for a time interval of $T_c$ seconds, which is called the chip time (see also FIG. 4). The transmitted signal is thus a sequence of sinusoidal signals with different phases as illustrated in FIG. 4. The inverse of the chip time is the chip rate, which is measured in chips per second. Typical chip rates for automotive radar are in the range of 10-2000 Mchip/s, meaning that typical chip times $T_c$ are in the range of 0.5 to 100 nanoseconds.

Also illustrated in FIG. 4 is the received radio signal that is due to a reflection of the transmitted radio signal from an object. The received radio signal (that includes the transmitted radio signal reflected from an object in the environment) will have the same basic shape as the transmitted radio signal but will be delayed by an amount corresponding to the round-trip time for the radio signal to propagate from the transmitter, to reflect from the object, and then propagate back to be received by the receiver.

The waveforms in FIG. 4 are shown with instantaneous phase transitions at the chip boundaries. In practice, these transitions will not be instantaneous, and the resulting waveform will not have discontinuities at these boundaries. Specific control over the nature of these transitions is sometimes used to make them conform to a certain shape of phase versus time. For example, when the phase transition versus time is designed to follow the shape of the integral of a Gaussian curve over a certain time interval, the modulation is referred to as Gaussian Minimum Shift Keying (GMSK). Such shaping of the phase transitions helps to reduce the spurious emissions of a radar transmitter outside its designated frequency band.

In a PMCW radar, the codes may consist of repeated sequences of random or pseudo-random binary values for each transmitter, e.g., (0, 0, 0, 0, 1, 1, 1, 0, 1, 1, 0, 0, 1, 0, 1) for one transmitter, although any sequence, including non-binary sequences and non-periodic sequences may be used.

The transmitted radio signals are reflected from objects in the environment and are received back at the radar receivers. Each object in the environment may reflect the transmitted radio signal. The received radio signal at the radar system therefore comprises the sum of the radio signals reflected from various objects (targets) in the environment, plus noise.

Figure 5:
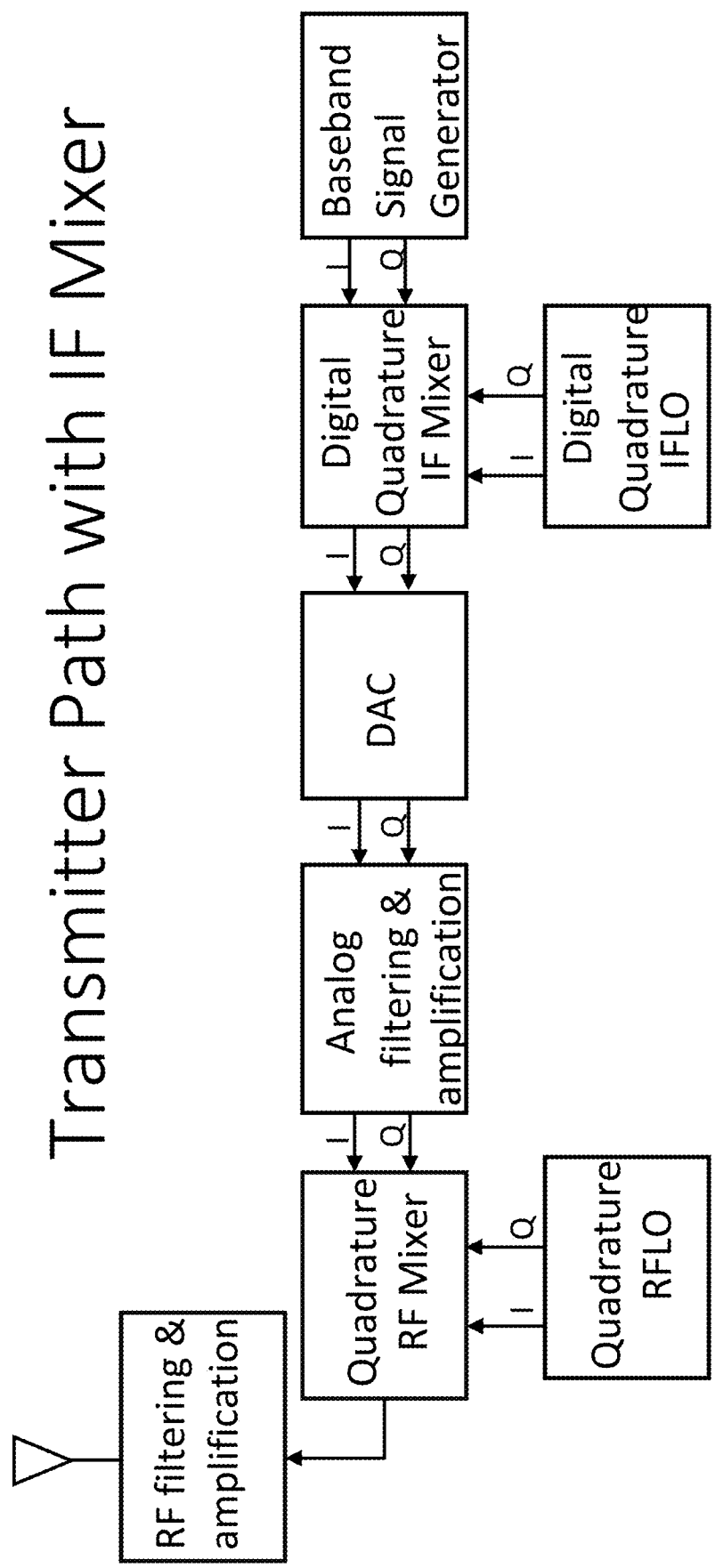
FIG. 5 is a block diagram of a transmitter according to an embodiment of the present invention.

FIG. 5 illustrates an exemplary block diagram of a transmitter in a radar system in a preferred embodiment of the present invention which uses heterodyne transmitter architecture to up-convert the baseband signal to the desired radio frequency for transmission in two steps, first up-converting the baseband signal to a selected intermediate frequency (IF), and then up-converting the IF signal to a radio frequency (RF) signal. There may be more than one transmitter in the radar system. A baseband signal is generated by a baseband signal generator which outputs a sequence of digital signal samples. These samples could be complex samples, representing the in-phase (I) and quadrature-phase (Q) portions of the baseband signal, as indicated by the two signal arrows emanating from the baseband signal generator. The mathematical representation of the baseband signal is as a sequence of complex samples (with a real part and an imaginary part), each sample taking the form I+jQ, where j is the square root of −1. The first up-conversion step, from baseband to IF, is performed by the digital quadrature IF mixer as shown in FIG. 5, and whose details are shown in FIG. 12. In the embodiment shown in FIG. 5, the baseband signal samples are used as an input to a digital quadrature IF mixer which multiplies the sequence of complex baseband samples by a second sequence of complex sample values generated by a quadrature intermediate frequency local oscillator (IFLO). The mathematical operation performed by the quadrature IF mixer is, for each sample in the sequence, a complex multiply of its two complex input values:

$$I_{out}=I_{baseband}*I_{iflo}-Q_{baseband}*Q_{iflo};$$

$$Q_{out}=I_{baseband}*Q_{iflo}+Q_{baseband}*I_{iflo}.$$

The quadrature IFLO produces a complex sample sequence which approximates the samples of a complex exponential signal $e^{j2\pi fkT}=\cos(2\pi fkT)+j*\sin(2\pi fkT)$, where T is the sample period, k is the time index, and f is the intermediate frequency (IF). The real part of the IFLO output, $I=\cos(2\pi fkT)$, and its imaginary part, $Q=\sin(2\pi fkT)=\cos(2\pi fkT-pi/2)$, are both sinusoidal waveforms of the time index k, whose phases are $\pi/2$ radians (90°) apart.

Hence the use of the term "quadrature". In the preferred embodiment, the quadrature IFLO is implemented digitally, although it is also possible to implement a continuous time analog IFLO.

Figure 7:
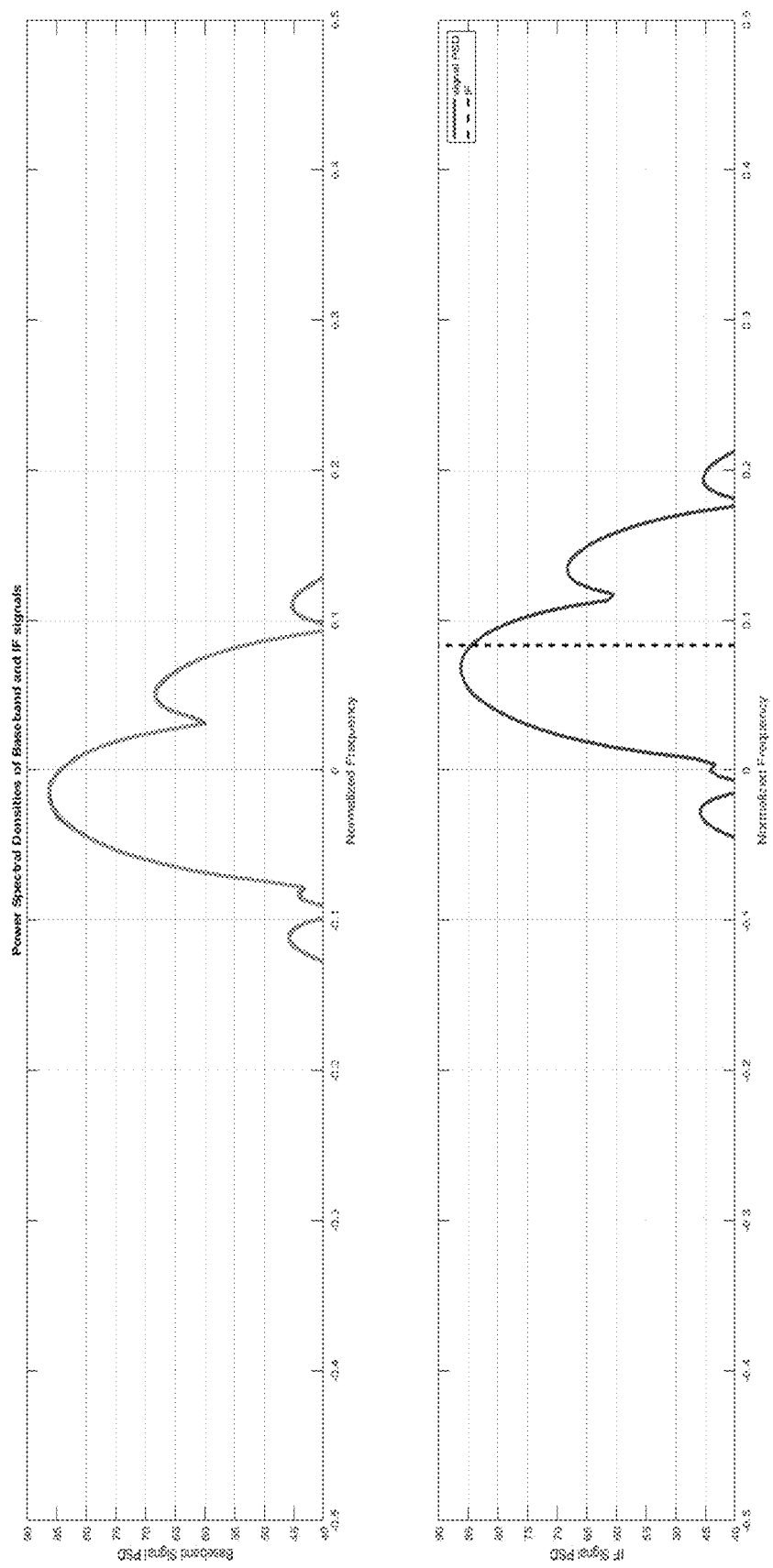
FIG. 7 illustrates the power spectral density of an exemplary baseband signal and the power spectral density of the same signal after it is upconverted to an IF of 0.0833 on the normalized frequency scale shown, according to an embodiment of the present invention.

When considered in the frequency domain, the effect of the quadrature IF mixer is to frequency shift the baseband signal spectrum by an amount equal to the intermediate frequency, $f_{IF}$. Thus, if the signal energy of the baseband were originally centered around DC (zero frequency), after the mixing it will have the same spectral shape but will be centered around $f_{IF}$. Note that because the signal is complex, it need not necessarily be symmetric about DC in its frequency content. FIG. 7 shows an exemplary power spectral density of a baseband signal for PMCW, and shows the power spectral density of the same signal after it has been up-converted to an IF of 0.0833 on the normalized frequency scale shown. Note that the entire power spectrum has simply been shifted to the right by 0.0833 by the quadrature mixer, and that its shape has been preserved. For a negative IF, the shift would be to the left.

Following the up-conversion to IF, the signal is converted from digital to analog by the DAC shown in FIG. 5, and further filtering and amplification is performed in the analog domain as shown in FIG. 5. Both the DAC and the analog amplification and filtering may contain non-ideal components subject to introducing DC offsets and/or flicker noise. Those offsets and flicker noise are not in the signal band of the IF signal, as they would have been if they were operating directly on the baseband signal without first up-converting it to IF. Thus, they are separated in frequency from the desired signal which improves radar system performance.

It is beneficial to choose the intermediate frequency (IF) for the transmitter low enough to permit digital implementation of the IF mixer, because unlike an analog implementation, a digital implementation can be made inherently free of DC offsets and is not subject to flicker noise. On the other hand, the IF must be chosen high enough to create a separation in frequency between the desired signal after it is up-converted to IF and the DC offsets and flicker noise which may be introduced by IF analog circuits. In a typical exemplary embodiment, this implies that the IF should be least one-half of the 2-sided bandwidth of the baseband signal and at most one-half of the maximum sample rate achievable by the DAC to be used in the transmitter path. The upper limit of a useful IF may also be limited by the bandwidth of the DAC output circuits and/or the analog amplification and filtering circuits prior to the RF mixer. In one embodiment, the maximum DAC sample rate is 8 GHz, while the maximum 2-sided baseband signal bandwidth is 2 GHz, so the range of most effective IF choices is from 1 GHz to 4 GHz. Lower IF can be used in the same radar system when it is configured for a lower chip rate such that the bandwidth of the baseband signal is reduced. IFs in this range are a small fraction of the typical radio frequency (RF) used by automotive radar, which is near 80 GHz, hence the system is characterized as low-IF.

Because the IFLO generates a complex exponential signal which can have either a positive or a negative frequency, the transmitter's IF can also be chosen as a negative frequency. This choice results in the RF signal appearing in the lower sideband instead of the upper sideband when modulating the RF carrier.

Following the amplification, filtering, and conversion to analog by the DAC, the IF signal is then frequency-shifted to the desired RF carrier frequency for transmission. This may be accomplished by a quadrature mixer as shown in FIG. 12.

Figure 13:
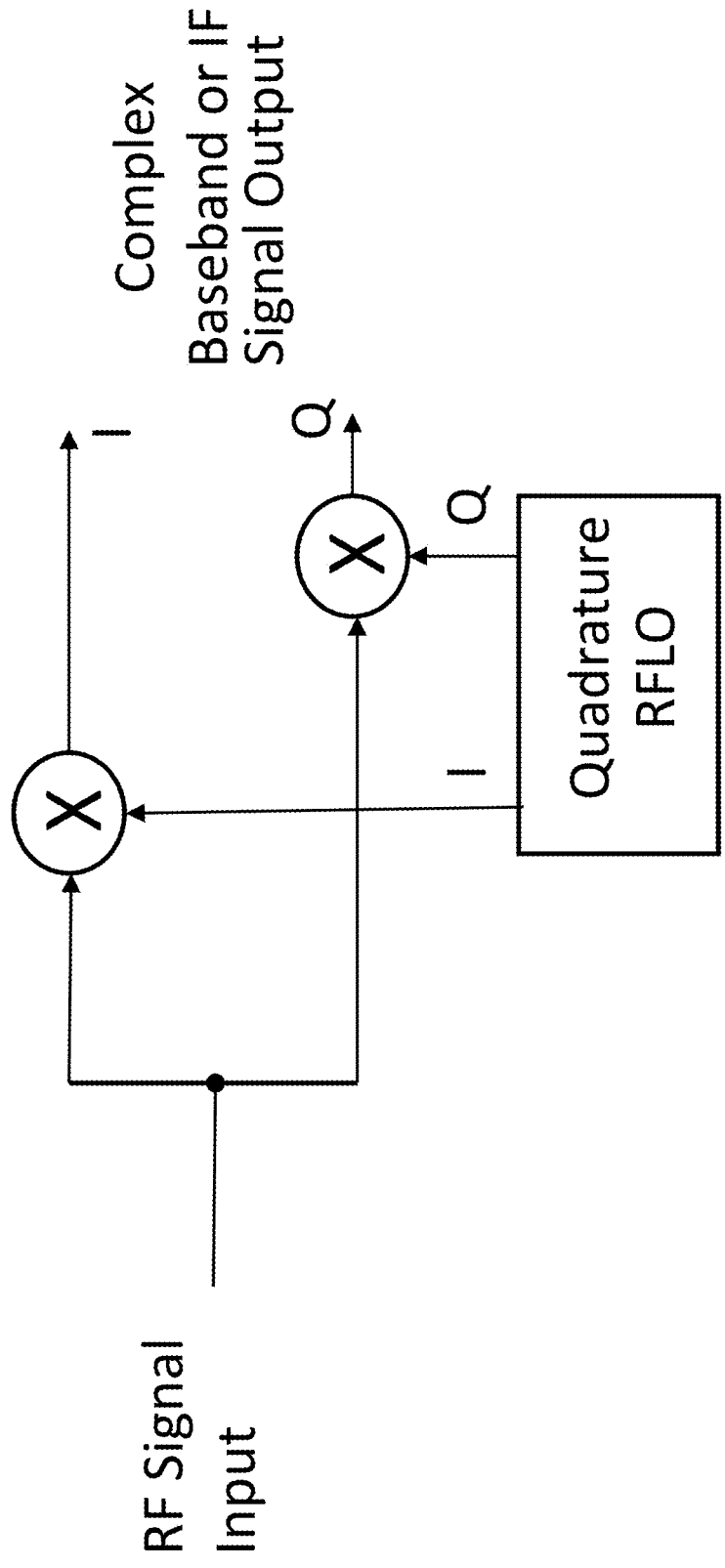
FIG. 13 is a block diagram for a quadrature mixer to down-convert an RF signal to baseband or to IF according to an embodiment of the present invention.

In a receiver of a radar system, the received radio signal is typically processed by amplification, filtering, and down-conversion. The down-conversion may be performed by multiplying the received signal with in-phase and quadrature-phase components of an RF local oscillator (RFLO), such as in the exemplary quadrature RF mixer illustrated in FIG. 6, and whose detail is shown in FIG. 13. The output after down-conversion and sampling (ADC output) is a sequence of complex-valued digitized samples comprising a mathematical real component, I, and a mathematical imaginary component, Q.

Figure 6:
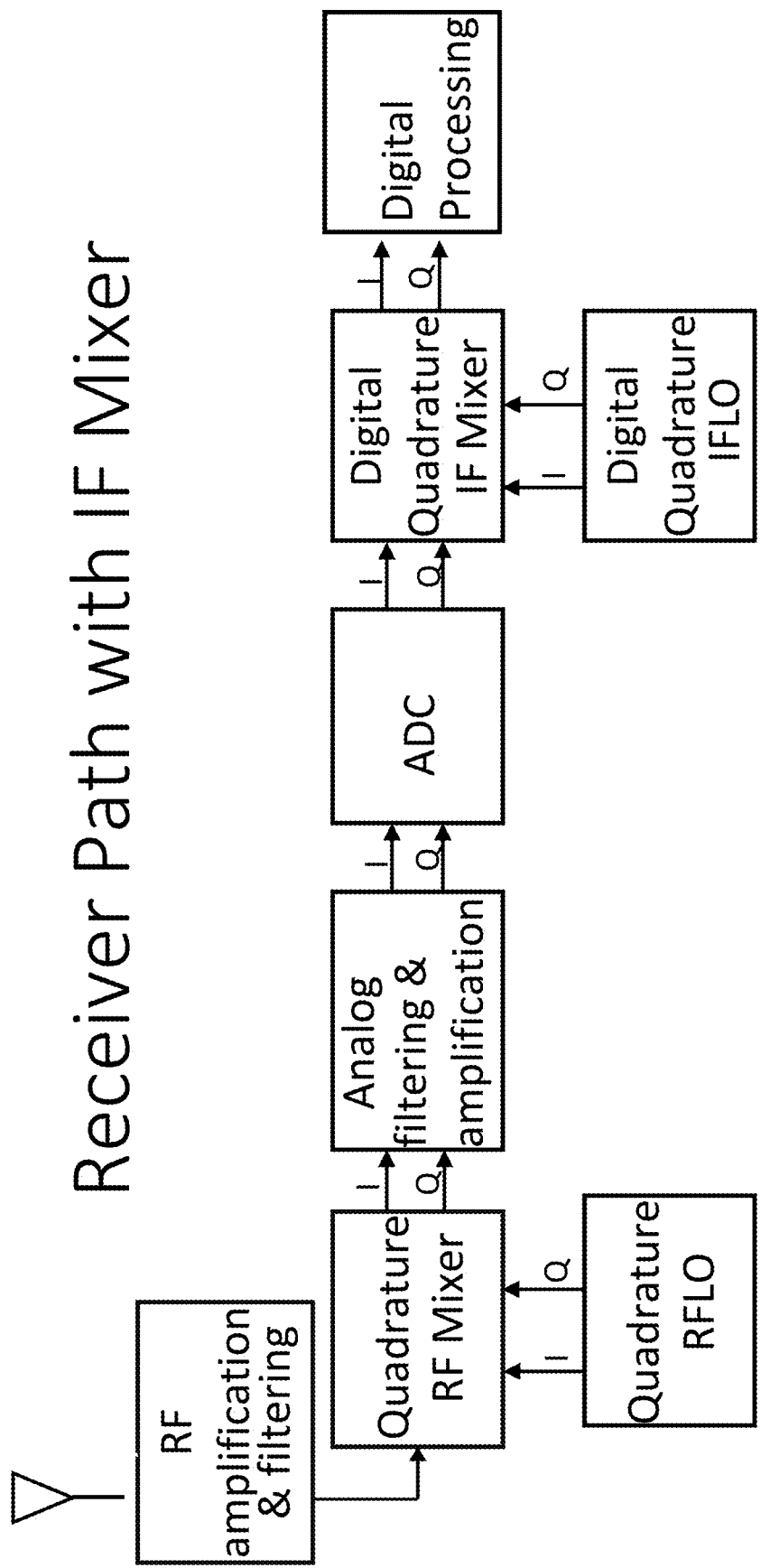
FIG. 6 is a block diagram of a receiver according to an embodiment of the present invention.

FIG. 6 shows a block diagram of a heterodyne receiver architecture in a preferred embodiment of the present invention. There may be more than one receiver in the radar system. The received radio signal from the receiver antenna is down-converted to IF, filtered and amplified, then sampled and quantized in an analog-to-digital converter (ADC). The down-converted IF signals are in general complex-valued (comprising a pair of real signals with regard to circuit implementation), representing the in-phase (I) and quadrature-phase (Q) of the RF signal. The output of the ADC is processed by the IF mixer which down-converts the signal to baseband. Further filtering and amplification may be optionally performed on the IF analog signals prior to the ADC, on the IF digital signals after the ADC, and/or on the baseband digital signals after the IF mixer.

In the embodiment shown in FIG. 6, the down-conversion of the received RF signal to the baseband signal is performed in two steps using a heterodyne receiver architecture with a selected intermediate frequency (IF). The first down-conversion step is performed by the quadrature RF mixer, such as shown in FIG. 6, and whose details are shown in FIG. 13. Following this down-conversion, the IF signal is converted from digital to analog by the ADC shown in FIG. 6, and further filtering and amplification are performed in the analog domain as shown in FIG. 6. Both the ADC and the analog amplification and filtering may contain non-ideal components subject to introducing DC offsets and/or flicker noise. Those offsets and flicker noise are not in the signal band of the IF signal, as they would have been if they were operating on the baseband signal. Thus, they are separated in frequency from the desired signal which improves radar system performance.

After digitization of the IF signal by the ADC in FIG. 6, the signal is passed through a digital quadrature IF mixer which down-converts the IF signal to baseband. Further processing, including filtering, is then performed on the digital baseband signal.

It is beneficial to choose an intermediate frequency (IF) for the receiver that is low enough to permit analog-to-digital conversion of the IF signal and digital implementation of the IF mixer, because such a digital implementation can be made inherently free of DC offsets and is not subject to flicker noise. On the other hand, the receiver's IF signal must be chosen to be high enough to create a separation in frequency between the desired signal after it is down-converted to IF and the DC offsets and flicker noise which may be introduced by IF analog circuits. In an exemplary embodiment, this implies that the receiver IF should be least one-half of the 2-sided bandwidth of the baseband signal and at most one-half of the maximum sample rate achievable by the ADC to be used in the transmitter path. In an aspect of the present invention, the maximum ADC sample rate is 2 GHz, while the maximum 2-sided baseband signal bandwidth is 2 GHz, so the most effective IF choice is 1 GHz. A lower IF can be used in the same radar system when it is configured for a lower chip rate, such that the bandwidth of the baseband signal is reduced. IFs of 1 GHz and below are a small fraction of the typical radio frequency (RF) used by automotive radar, which is near 80 GHz, hence the system is characterized as low-IF.

Because the IFLO generates a complex exponential signal which can have either a positive or a negative frequency, the receiver's IF can also be chosen as a negative frequency.

It is not required, but it is beneficial to choose the same IF for the transmitter and for the receiver. One advantage is that this choice allows the RFLO to be shared between the receiver and the transmitter, because the frequency it is required to generate is the same for the RX and TX paths. This has an obvious advantage in cost and power dissipation. In addition, certain non-ideal behavior of the RFLO, such as its phase noise, have reduced effects on radar system performance.

Figure 8:
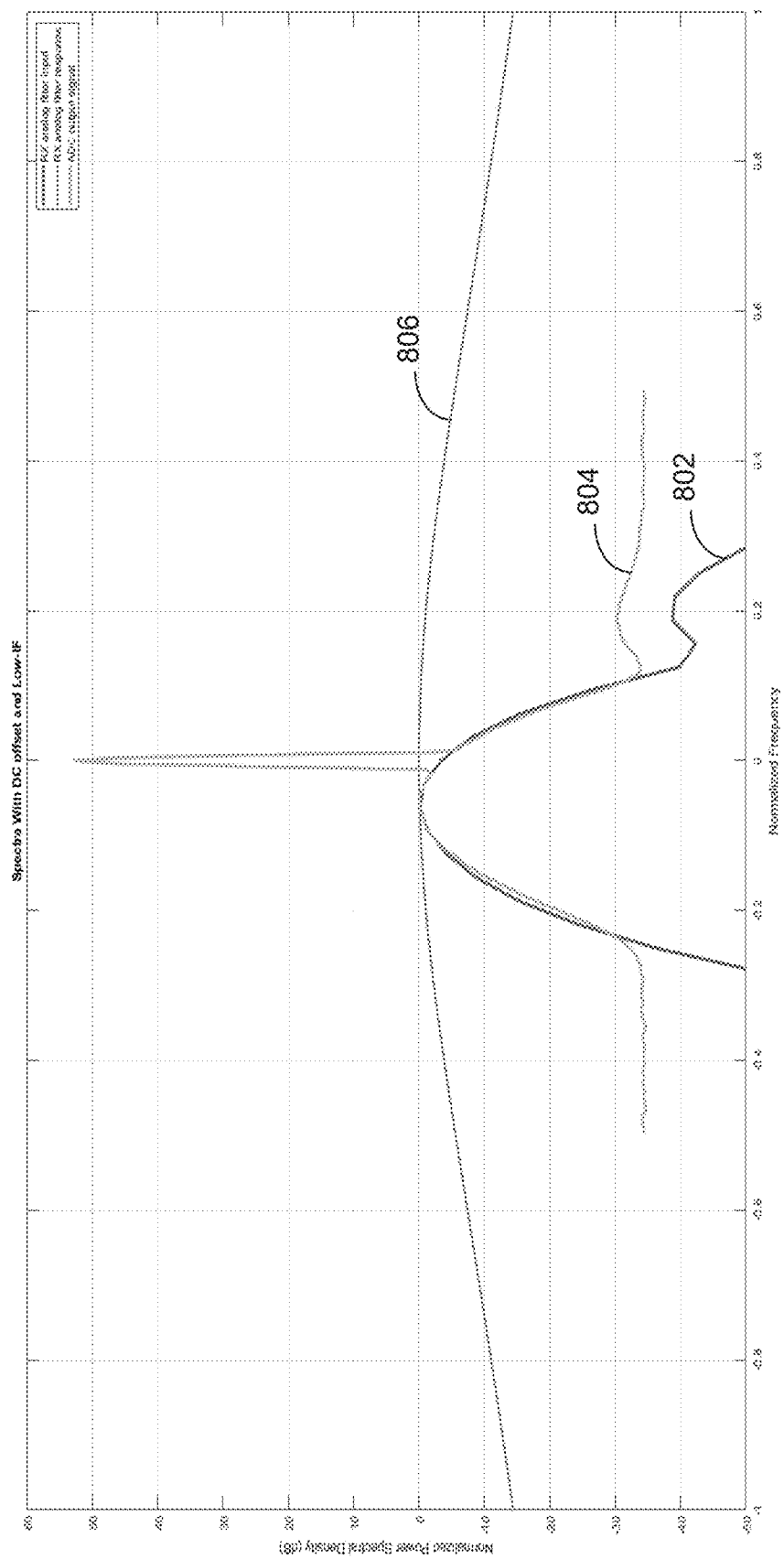
FIG. 8 illustrates exemplary power spectral densities (PSDs) of signals at different points in a receiver path when using zero-IF, along with an exemplary filter magnitude response of an analog receiver filter.

FIG. 8 illustrates a power spectral density (PSD) of an exemplary curve 802 at the input to the analog filtering and amplification block in the receiver path of FIG. 6, when the present invention is not practiced. That is, when the signal is converted directly from RF to baseband, or equivalently when the IF is chosen as zero frequency. After that signal has passed through the analog filtering and amplification and the ADC, its power spectral density is shown as curve 804. Curve 804 closely approximates the original curve 802 at all frequencies except DC (zero frequency) and the immediate vicinity around DC. This is due to the DC offset and flicker noise added to the signal by the non-ideal behavior of the analog circuits. An exemplary magnitude response of the analog filtering is also shown, as signal curve 806.

Figure 9:
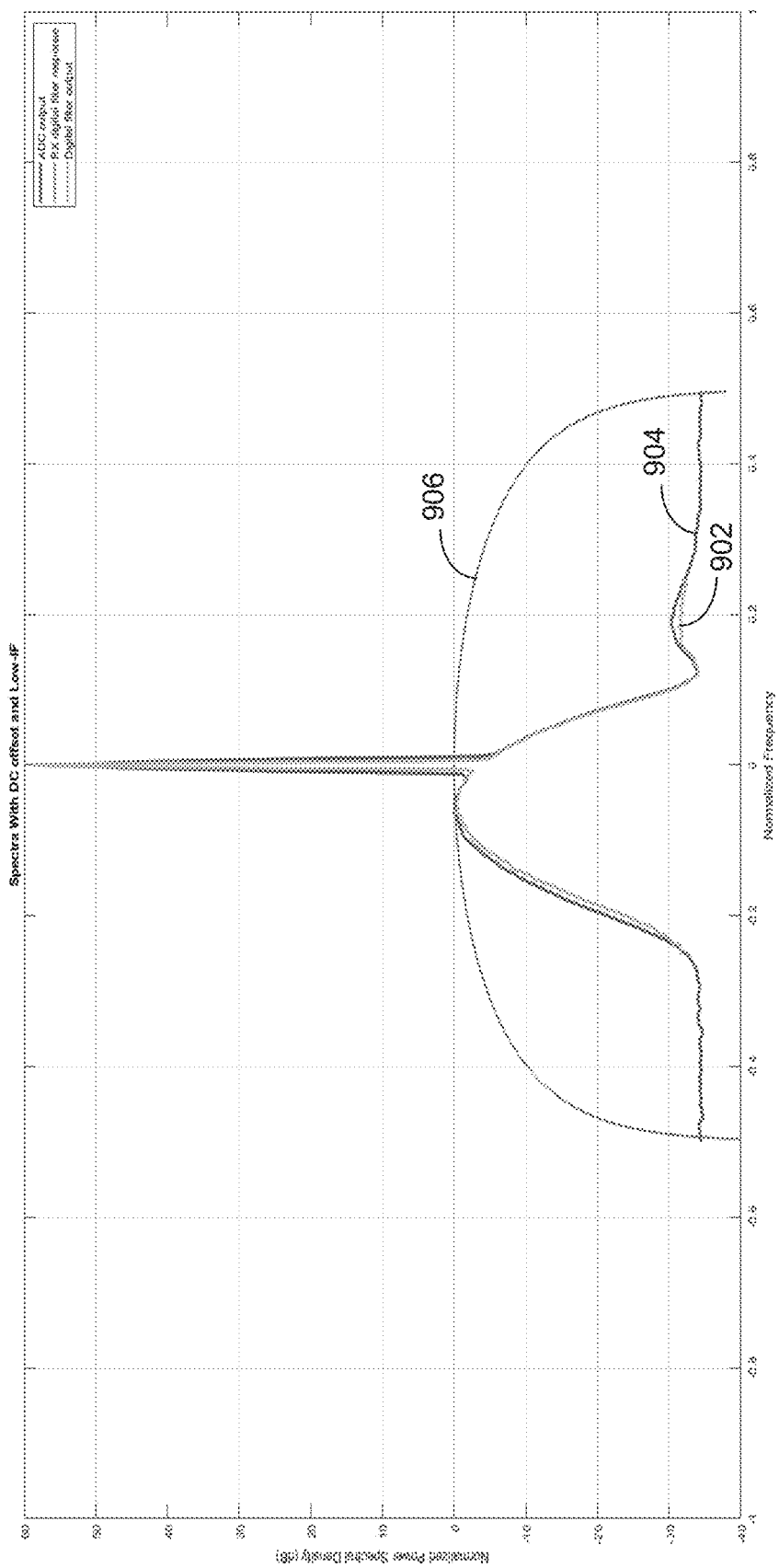
FIG. 9 illustrates exemplary power spectral densities (PSDs) of signals at additional points in a receiver path when using zero-IF, along with an exemplary filter magnitude response of a digital receiver filter.

FIG. 9 continues illustrating the case where the present invention is not practiced (i.e., where the IF is zero) and shows again the PSD of the ADC output as curve 904 which is the same as the signal curve 804 from FIG. 8. Also shown in FIG. 9, as the signal curve 906 is an exemplary magnitude response of a digital filter that operates on the baseband signal; and the output of that filter whose PSD is shown as the curve 902. Note that the digital baseband filter has essentially no helpful effect with regard to suppressing the DC and flicker noise.

Figure 10:
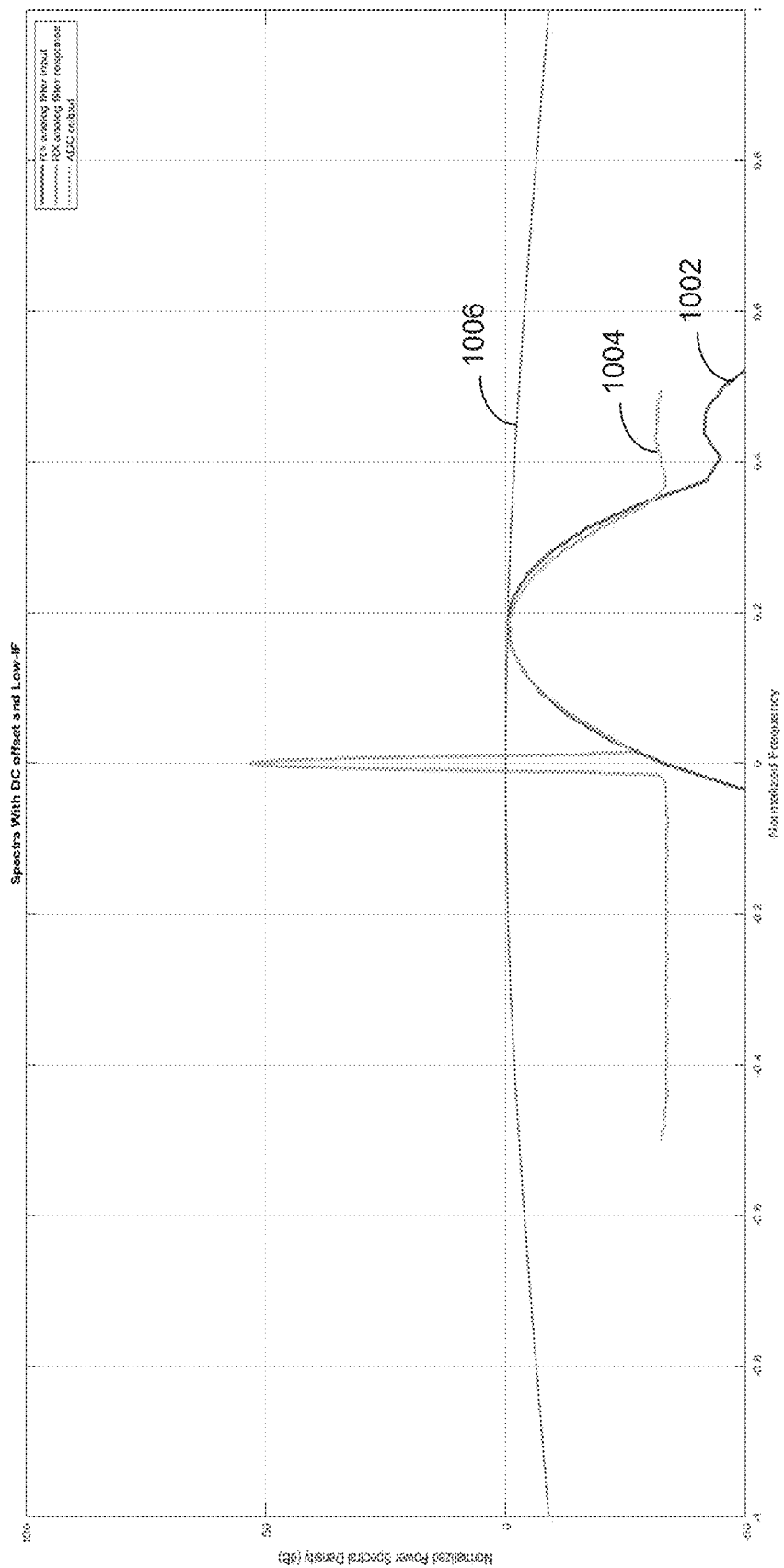
FIG. 10 illustrates exemplary power spectral densities (PSDs) of signals at different points in a receiver path when using low-IF, along with an exemplary filter magnitude response of an analog receiver filter, according to an embodiment of the present invention.

FIG. 10 shows as curve 1002 the power spectral density (PSD) of an exemplary signal at the input to the analog filtering and amplification block in the receiver path of FIG. 6, when the present invention is practiced with an IF of 0.25 on the normalized frequency scale shown. After that IF signal has passed through the analog filtering and amplification and the ADC, its power spectral density is shown as the curve 1004. The resulting PSD closely approximates the original PSD (curve 1002) at all frequencies except DC (zero frequency) and the immediate vicinity around DC. This is due to the DC offset and flicker noise added to the signal by the non-ideal behavior of the analog circuits. An exemplary magnitude response of the analog filtering is also shown, as the curve 1006. Thus, the frequency at which the DC and flicker noise impact the signal is separated from the main lobe of the desired signal's PSD. This improves radar performance.

Figure 11:
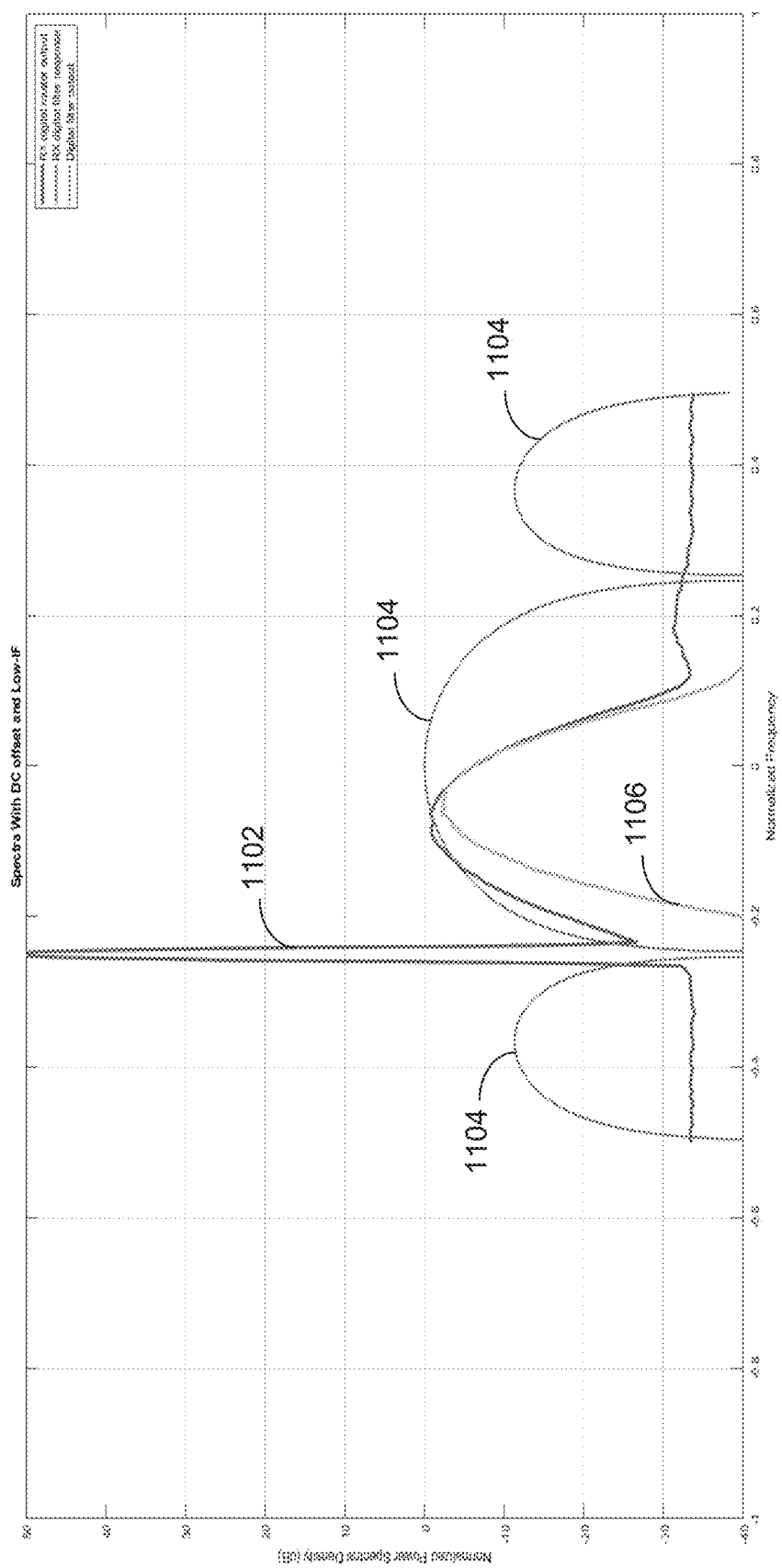
FIG. 11 shows exemplary power spectral densities (PSDs) of signals at additional points in a receiver path when using low-IF, along with an exemplary filter magnitude response of a digital receiver filter, according to an embodiment of the present invention.

FIG. 11 continues illustrating the case when the present invention is practiced (the IF is 0.25), and shows again the PSD of the ADC output (as curve 1102) which is the same as the curve 1004 from FIG. 10. Also shown in FIG. 11 as the curve 1104 is an exemplary magnitude response of a digital filter that operates on the baseband signal, and the output of that filter whose PSD is shown in curve 1106. Note that the digital baseband filter has been designed to have a notch at the frequency of −0.25, which is the location of the DC offset and flicker noise after they have been down-converted by the quadrature IF mixer. This notch has only a mild effect on the desired signal energy which is predominantly at frequencies higher than −0.25, as can be seen by comparing the main signal lobe of the curve 1102 with that of the curve 1106, but it greatly suppresses the undesired effects of the DC offset and flicker noise of the analog circuits. This suppression improves radar performance.

Further signal processing is typically performed on the baseband signal in order to detect objects in the radar system's field of view and to determine their range (distance), velocity, and angle (location). A summary of that processing in a preferred embodiment of the invention follows.

In a PMCW radar system, the baseband signals used at the transmitter and the reflected radio signals after down-conversion to baseband in the receiver are typically provided to correlators which sum the products of the received and delayed transmitted signals. The complex valued digitized samples at the output of the receiver's down-converter to baseband are correlated with various time-delayed replicas of the baseband transmitted signals to produce complex correlation values corresponding to a certain segment of time. That is, a sequence of digitized received baseband samples that correspond to a certain time segment are correlated with a time-delayed replica of the baseband transmitted signal. This correlation process is performed for an assortment of different time-delays, also known as correlation lags. When the received signal contains a reflection from an object in the radar's field of view, the correlation will have a larger magnitude at the particular time-delay (correlation lag) which causes the delayed transmitted signal to align in time with the received reflected signal. Surrounding values of the correlation for other lags where there is no corresponding reflecting object will not have a large magnitude, so a correlation magnitude peak can be discerned. The lag at which the peak occurs corresponds to the round trip travel time of the radio signal from the radar system to the reflecting object. From this round trip travel time and the speed of light, the distance to the object can be computed.

Typically, the correlation lags are varied across a range with some chosen step size in time. The distance which light travels in ½ the amount of time of the lag step size (because the radio signals must travel both directions, from the radar to the object and back) corresponds to the range (distance) step size of the radar system. Each such correlation lag is therefore often referred to as a range bin.

Figure 15:
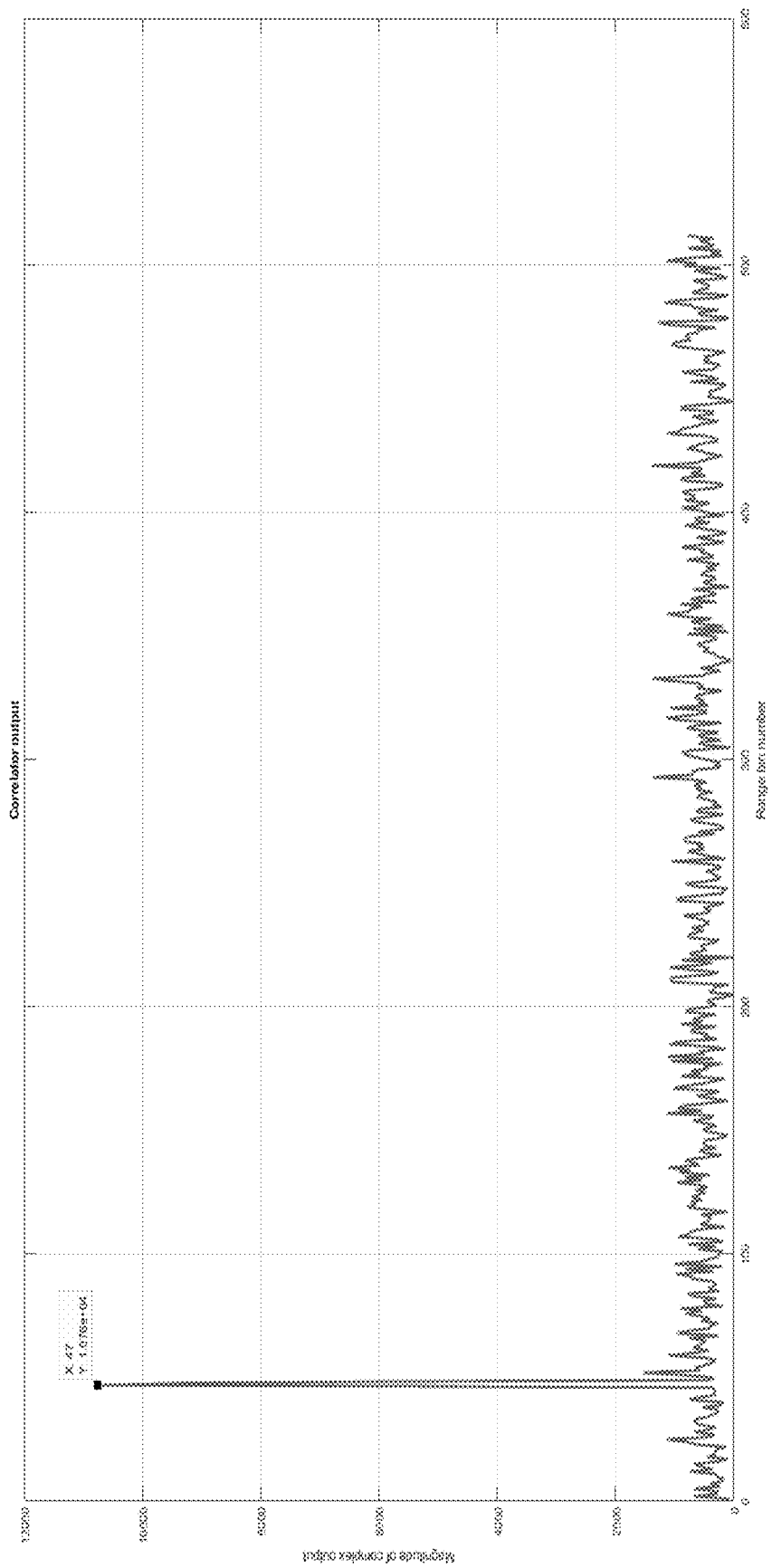
FIG. 15 is an exemplary output of a correlator for detecting targets in the radar's field of view and determining their distance (range) when utilizing the present invention.
Figure 16:
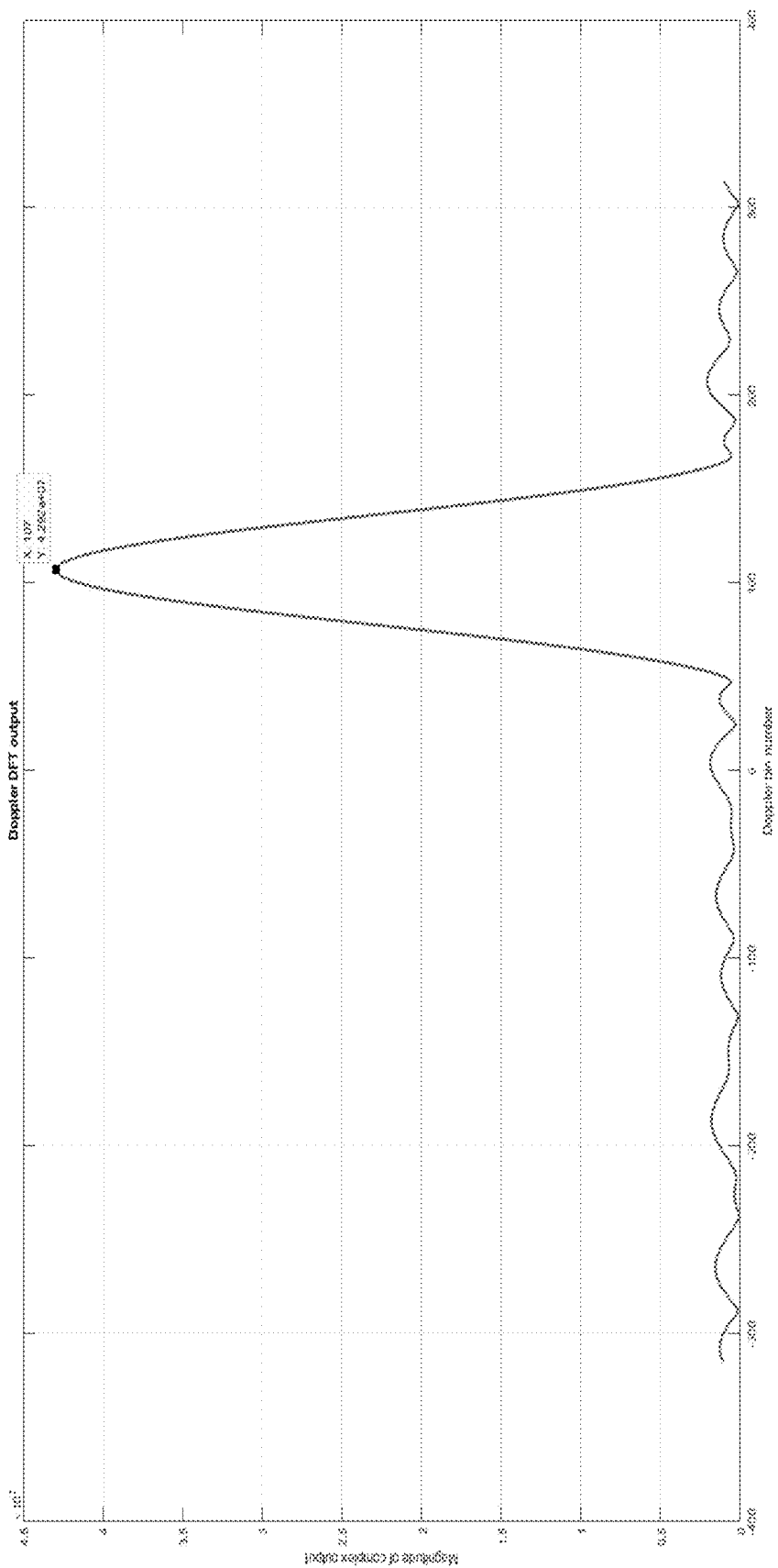
FIG. 16 is an exemplary output of a Doppler FFT for determining the radial velocity of targets in the radar's field of view when utilizing the present invention.
Figure 17:
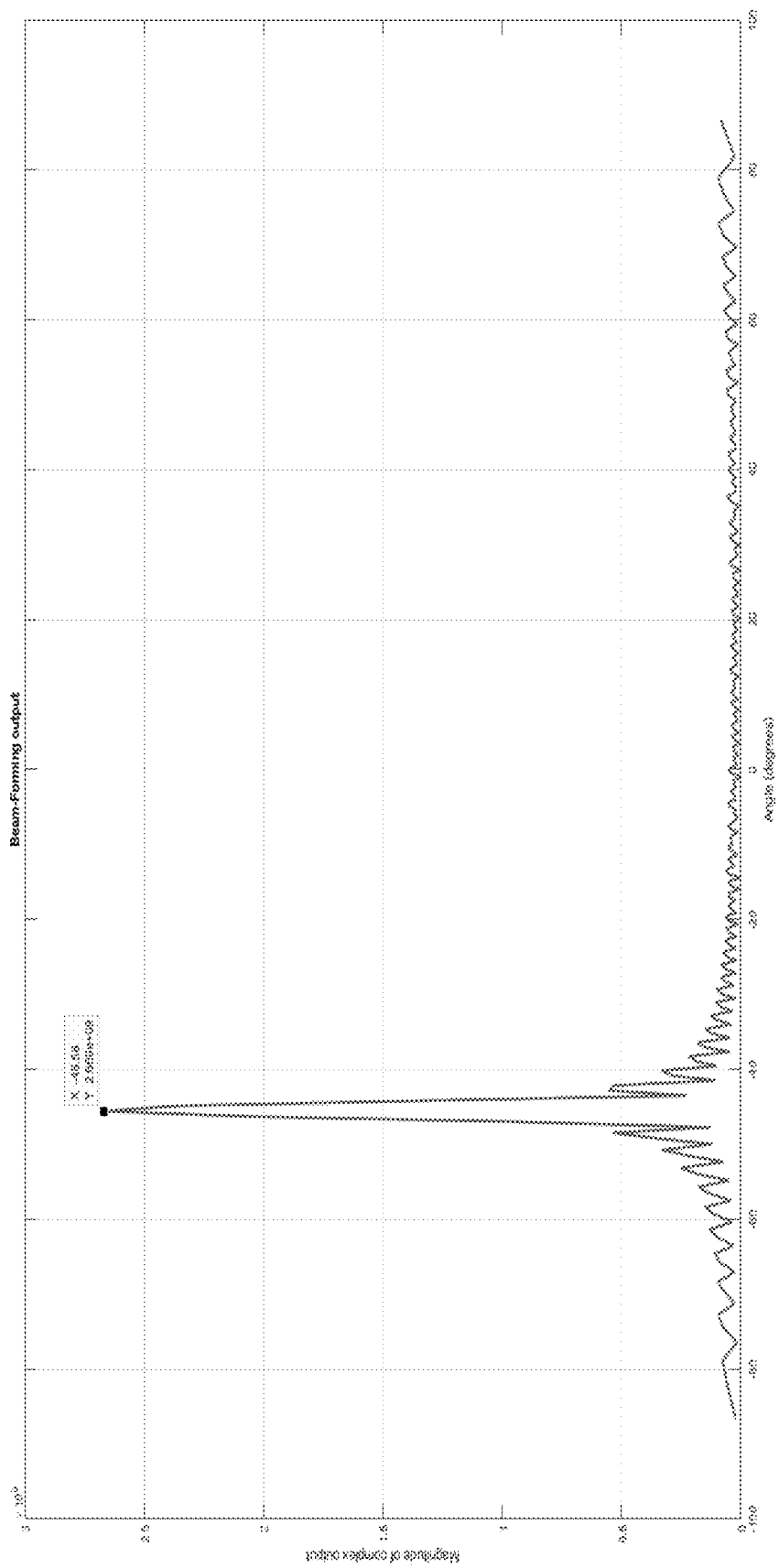
FIG. 17 is an exemplary output of a beam-forming algorithm using multiple TX antennas and multiple RX antennas for determining the azimuth angle of targets in the radar's field of view when utilizing the present invention.

FIG. 15 through FIG. 17 illustrate some exemplary performance results from a radar system using digital low-IF in accordance with the present invention.

FIG. 15 shows an exemplary output of such a correlator as a function of the correlation lag. A peak is seen in the magnitude of the correlator's output at range bin number 47. The correlation lag corresponding to range bin 47 represents a target distance from the radar of approximately 14 meters. Thus, from examining this correlator output, it may be determined that there is an object in the radar system's field of view that is reflecting radio signals and is about 14 meters distant from the radar system's antennas.

If the velocity of the radar system is different from the velocity of the object causing the reflection, there will be a Doppler shift in the frequency of the reflected signal relative to the transmitted signal. A sequence of correlator outputs for one particular time-delay (correlation lag) corresponding to an object moving in the environment will have complex values that rotate in the complex plane at a rate proportional to the Doppler shift. Using a sequence of correlator outputs (also referred to as a scan), the Doppler shift may be estimated, and thus the velocity of the object in the environment determined. The longer the sequence of correlator outputs used to estimate the Doppler frequency, the greater the accuracy and resolution of the estimation of the Doppler frequency, and thus the greater the accuracy in estimating the velocity of the object.

To accomplish the measurement of Doppler shift, the correlation process for all correlation lags is repeated for multiple subsequent time segments of the received signal. This repetition produces a sequence of complex correlation values for each given time-delay (correlation lag). Typically the sampling period of this sequence is much longer than the step size over which the correlation lags are varied, and can be thought of as "slow time." The "slow time" sampling interval in a typical automotive radar system is 2-30 microseconds. "Fast time" corresponds to the step size over which the correlation lag is varied, and is typically equal to the chip time or some fraction thereof, which for automotive radar may be typically in the range of 0.1 to 10 nanoseconds. The discrete Fourier transform (DFT) of this "slow time" sequence for a given correlation lag will show a peak corresponding to the Doppler shift of the detected object. The Doppler frequency of the peak can then be used to compute the object's radial velocity with respect to the radar antennas.

The frequency spacing of the outputs of the discrete Fourier transform represents the step size over which Doppler frequencies can be measured. Each such Fourier transform output is therefore referred to as a Doppler bin. FIG. 16 shows exemplary output of such a DFT of a sequence of complex correlator outputs for a particular range bin (bin 47, so chosen because it was previously identified from FIG. 15 that there was an object at that distance). In FIG. 16 a peak can be seen in the Doppler DFT output magnitude at Doppler bin 107. This corresponds to a Doppler frequency shift caused by motion of the reflecting object toward the radar system at approximately 20 meters/second.

Another dimension of the radar receiver's data array is created by taking different pair-wise combinations of a transmitter antenna with a receiver antenna, and for each such combination, performing the correlations over different lags and the discrete Fourier transforms to extract the Doppler frequencies. Each combination of one TX antenna with one RX antenna is known as a virtual receiver, denoted Vrx. The third dimension of the radar data is thus the Vrx number. Signal processing techniques such as beam-forming can be applied across this Vrx dimension, and based on the geometry of the transmit and receive antenna arrays they can be used to determine the direction (angle) to the reflecting object. FIG. 17 shows an exemplary output of a beam-forming computation using a collection of 96 Vrx that resulted from a radar system using 12 transmit antennas and 8 receive antennas. In FIG. 17, the magnitude of the complex beam-forming output is plotted versus angle, for a particular range bin (47) and a particular Doppler bin (107) which were previously identified as containing a target. A peak in the magnitude of the complex beam-forming output can be seen at an angle of approximately −45 degrees. Therefore, it has been determined that the reflecting object at a range of 14 meters and at a velocity of 20 meters/second towards the radar system, is located at an azimuth angle of −45 degrees. All of these values are in agreement with an actual (known) target in the radar's field of view.

Figure 18:
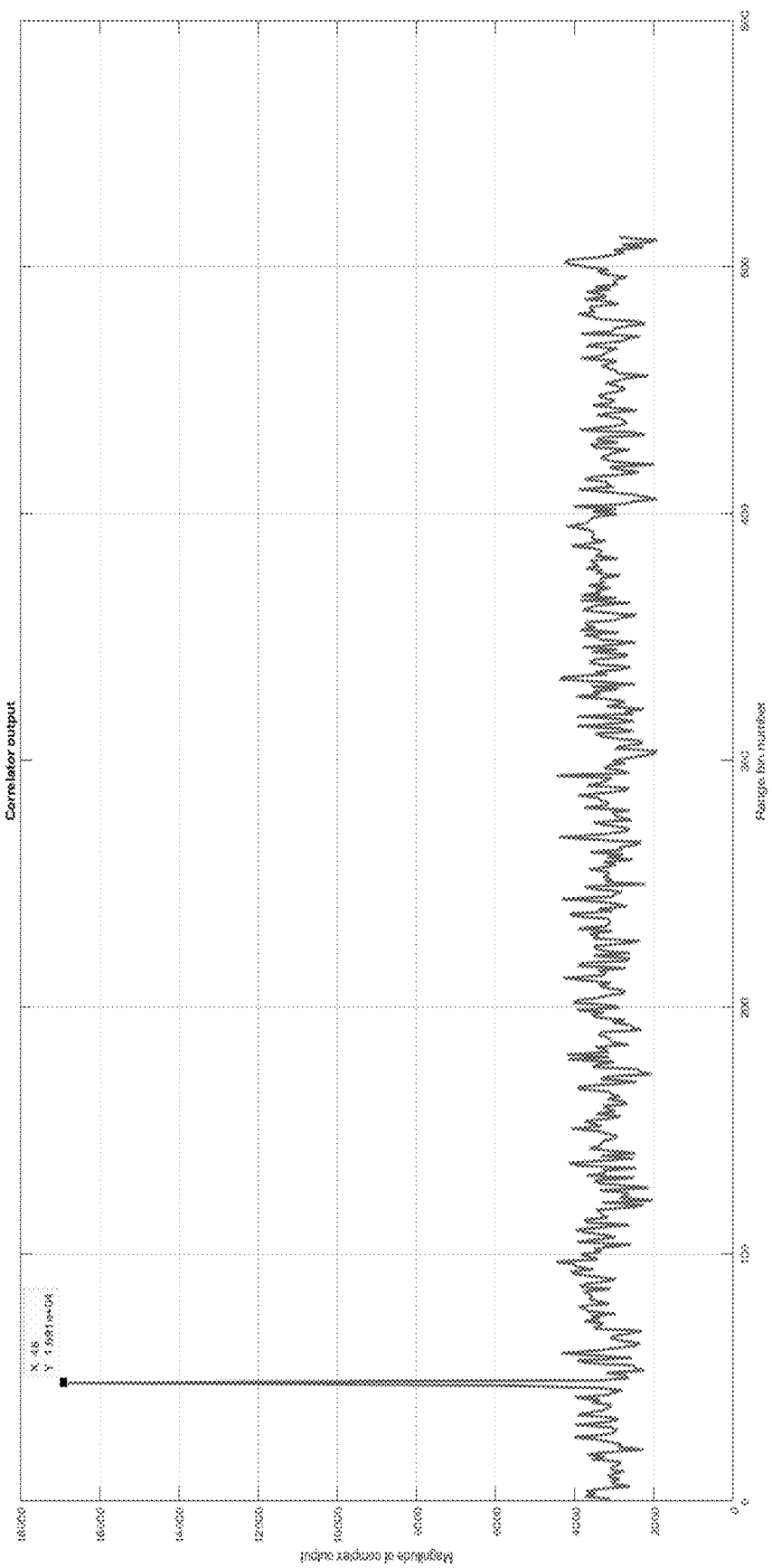
FIG. 18 is an exemplary output of a correlator for detecting targets in the radar's field of view and determining their distance (range) when not utilizing the present invention.
Figure 19:
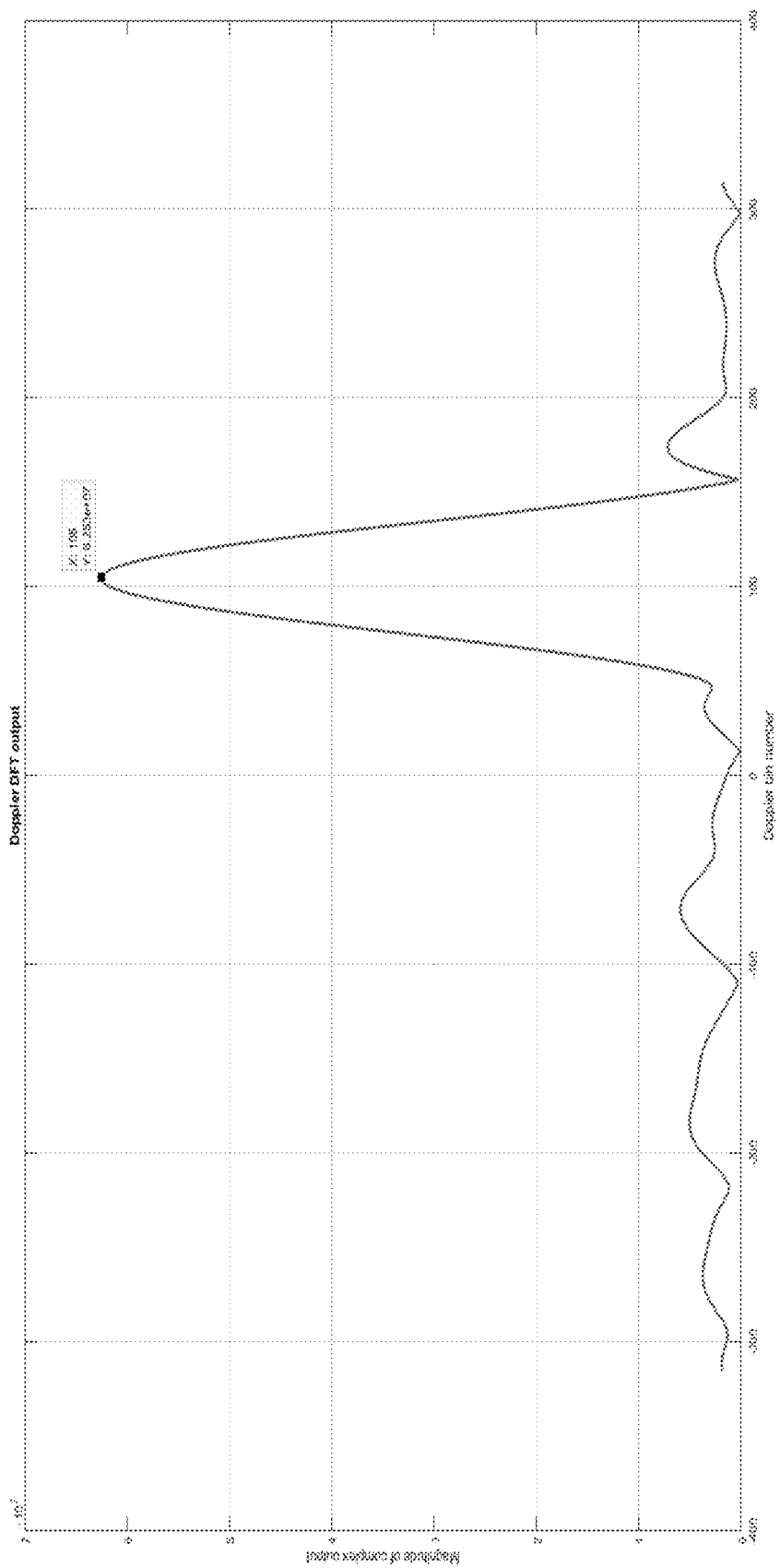
FIG. 19 is an exemplary output of a Doppler FFT for determining the radial velocity of targets in the radar's field of view when not utilizing the present invention.
Figure 20:
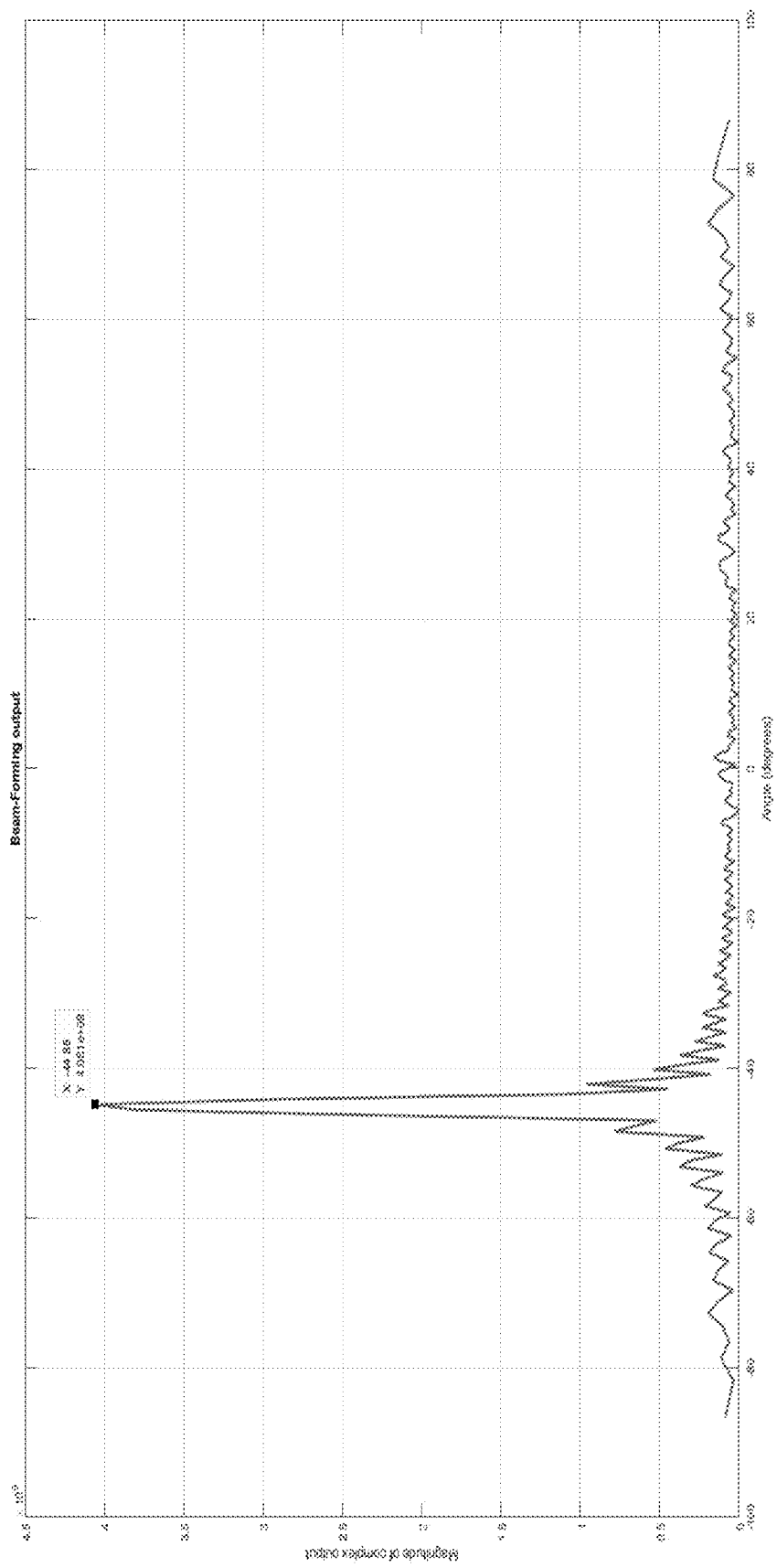
FIG. 20 is an exemplary output of a beam-forming algorithm using multiple TX antennas and multiple RX antennas for determining the azimuth angle of targets in the radar's field of view when not utilizing the present invention.

FIG. 18 through FIG. 20 correspond to FIG. 15 through FIG. 17, except that the radar system does direct down-conversion from RF to baseband, hence does not practice the present invention. The DC offset and flicker noise introduced into the baseband signal by the analog filtering and amplification circuits and the ADC cause substantial degradation of the ratio of the height of the correlation peaks to their respective noise floors when compared to FIG. 15 through FIG. 17. This illustrates an aspect of the performance advantage gained by employing the present invention.

Considering the range bins, the Doppler bins, and the Vrx numbers (or the angle bin numbers they can be converted to via beam-forming), the radar system's data is thus a three-dimensional array which is referred to as the radar data cube.

The ability of a continuous wave radar system to distinguish multiple targets is dependent upon the radar system's range, angle, and Doppler resolutions. Range resolution is limited by a radar's bandwidth (i.e., the chip rate in a phase modulated continuous wave radar), while angle resolution is limited by the size of the antenna array aperture. Doppler resolution is limited by the time duration of a scan. A high Doppler resolution is very valuable because no matter how close two objects or targets are to each other, as long as they have slightly differing radial velocity (their velocity towards or away from the radar system), they can be distinguished from one another by a radar system with a sufficiently high Doppler resolution.

Figure 14:
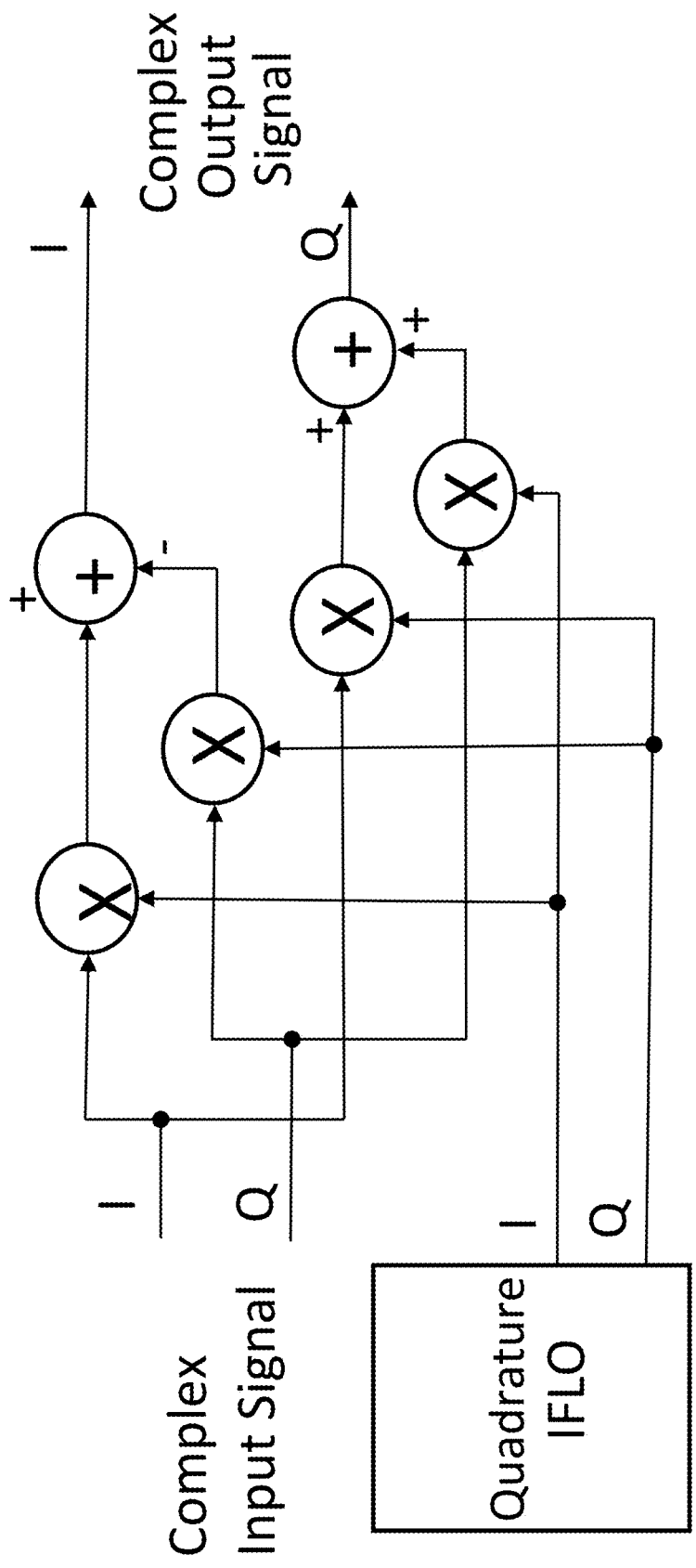
FIG. 14 is a block diagram for a quadrature mixer configured to convert in either direction between baseband and IF according to an embodiment of the present invention.

The digital quadrature IF mixers in both the transmitter (see FIG. 5) and receiver (see FIG. 6) of a radar system may be implemented in a variety of ways besides that shown in FIG. 14. In an exemplary embodiment illustrated in FIG. 21, a portion of the transmitter's baseband signal generator comprises a table lookup which can be used to shape the phase transitions as desired (for example, as GMSK) by programming appropriate values into the table. The N address bits of the table come from the current and several past input codes (chips). This table-based modulator can be augmented by adding a state machine to generate a sequence representative of the phase of the IFLO, represented by an M-bit number. The table can be expanded to contain enough entries for the combined M+N address bits, and can be programmed with values that will directly produce the IF signal that corresponds to the original baseband signal up-converted to IF. The multiplication and addition operations that would have been performed as in FIG. 14 are pre-computed for all possible cases, and the results programmed into the table.

Figure 21:
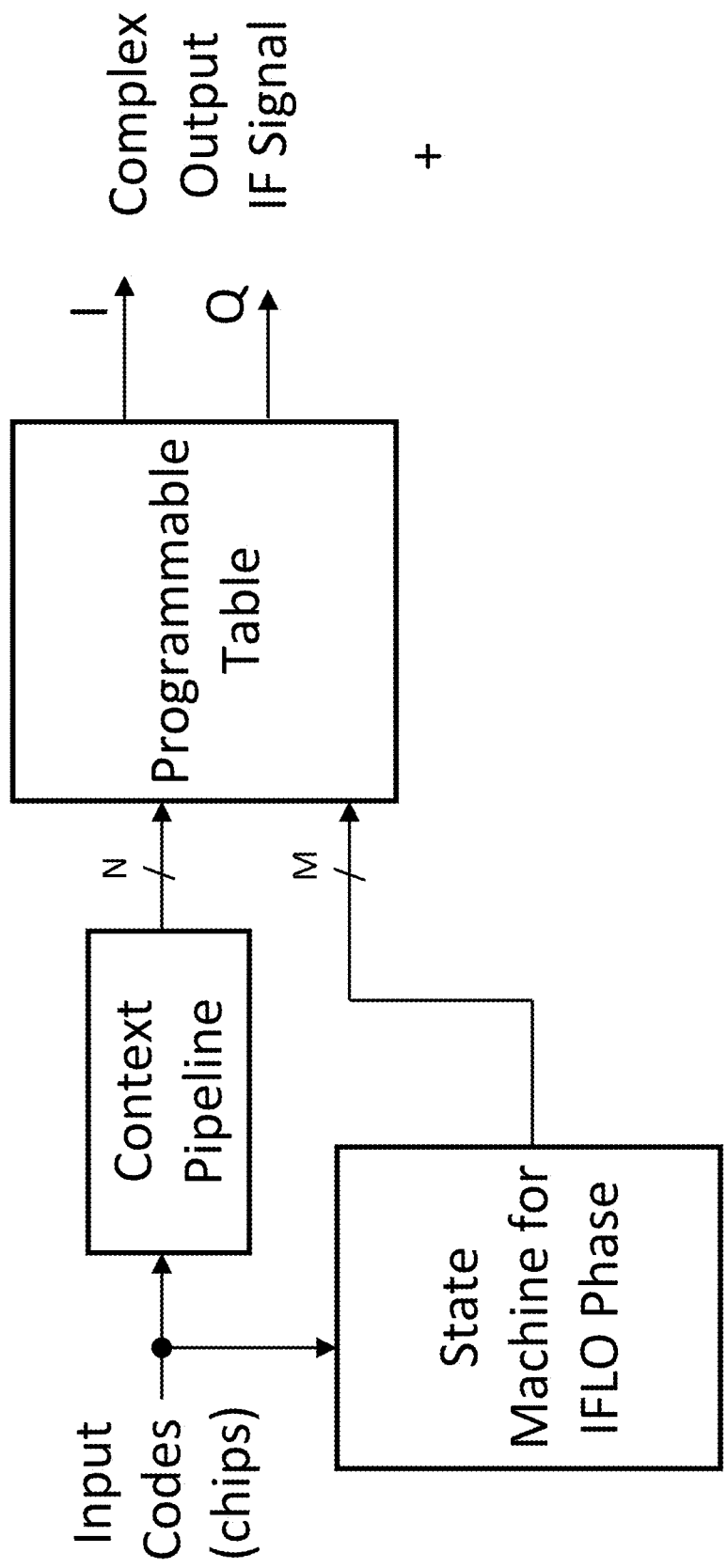
FIG. 21 is a block diagram showing an alternative implementation of an IF mixer for a transmitter in which the mixer functionality is combined with a table-based modulator which is part of a baseband signal generator, according to an embodiment of the present invention.

The programmable elements of the table of FIG. 21 can also be modified to perform additional functions in the transmitter, including the correction of any gain or phase imbalance between the I and Q paths in the analog circuits of the transmitter path, the control of the overall transmitted signal power, and transmitter phased array beam-forming which directs transmitted power predominantly in a desired direction.

Figure 22:
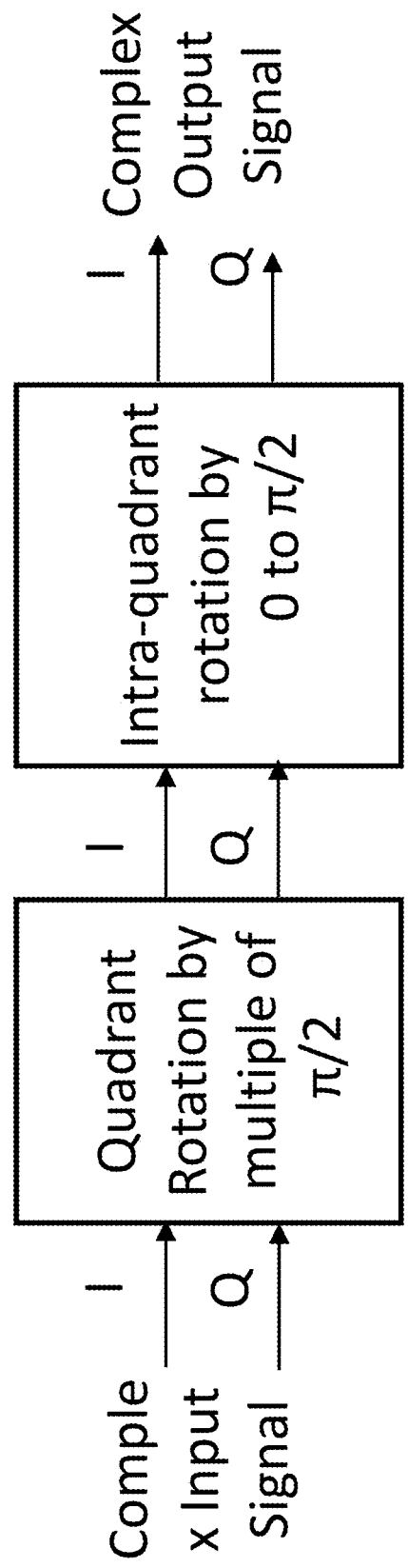
FIG. 22 is a block diagram showing how the IFLO mixer of FIG. 14 can be factored into a quadrant control portion and an intra-quadrant angle portion according to an embodiment of the present invention.
Figure 23:
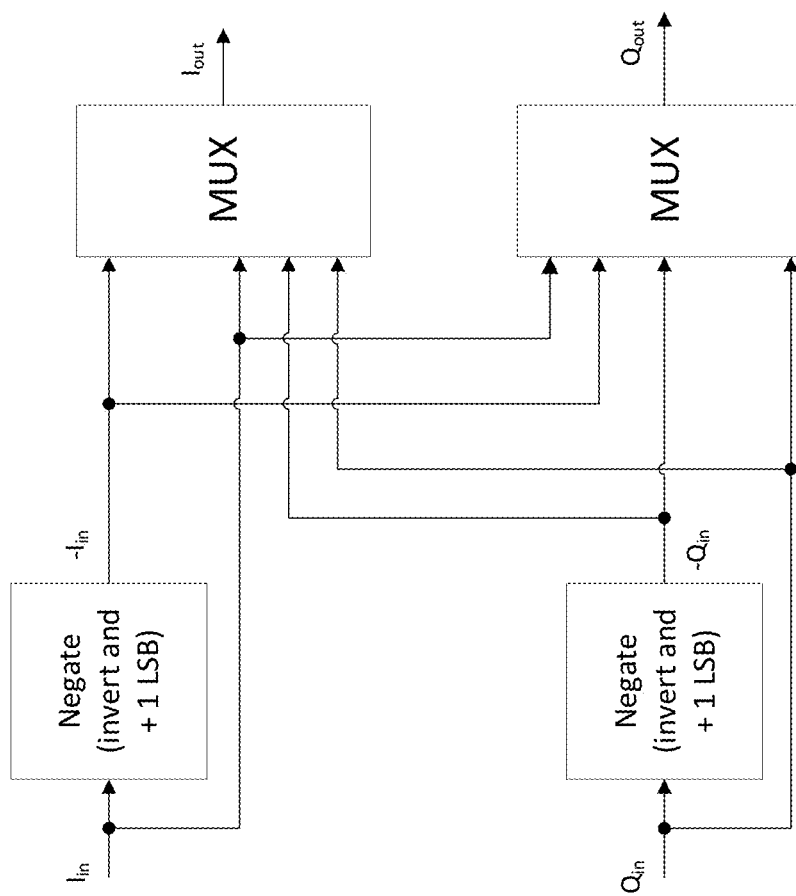
FIG. 23 is a block diagram of the quadrant portion of an embodiment of an IF mixer according to the factorization shown in FIG. 21.

In an embodiment shown in FIG. 22, the quadrature IF mixer of FIG. 14 has been factored into two parts which are applied sequentially. As mentioned earlier, each sample of the IFLO output sequence is of the form $e^{j2\pi fkT}=\cos(2\pi fkT)+j*\sin(2\pi fkT)$. A complex number of this form is a rotation in the complex plane, which can be factored into a sequence of two rotations, one of which is restricted to multiples of $\pi/2$ (90 degrees), and the other is in the range of 0 to $\pi/2$. One rotation determines the quadrant, and the other determines the angle within the quadrant.

Figure 24:
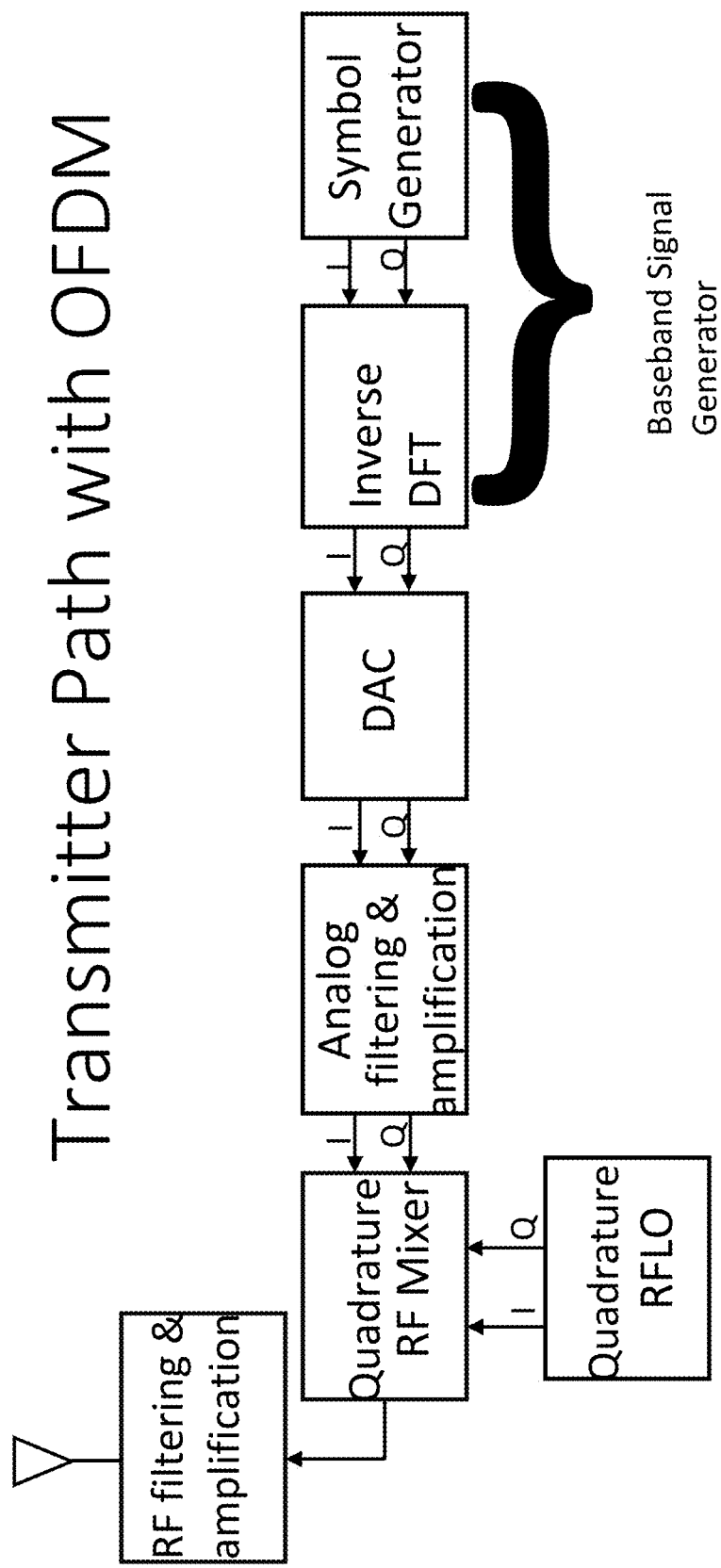
FIG. 24 is a block diagram of an alternative embodiment of a transmitter modulating transmitted radio signals with OFDM according to an embodiment of the present invention.

Instead of using a heterodyne radio architecture, another embodiment of the present invention generates baseband signals, which have little or no energy at DC and the low frequencies that are affected by flicker noise. One way to accomplish this is by using orthogonal frequency division modulation (OFDM) as shown in FIG. 24. It does not require an IF mixer as a heterodyne architecture would. The symbol generator is constrained to produce zeros or complex values with a reduced weighting for the samples corresponding to the frequencies at and near DC, such that when they are passed through the Inverse DFT the resulting waveform sent to the DAC is DC-free or nearly so, and also has low power at low frequencies that may be affected by flicker noise.

Figure 25:
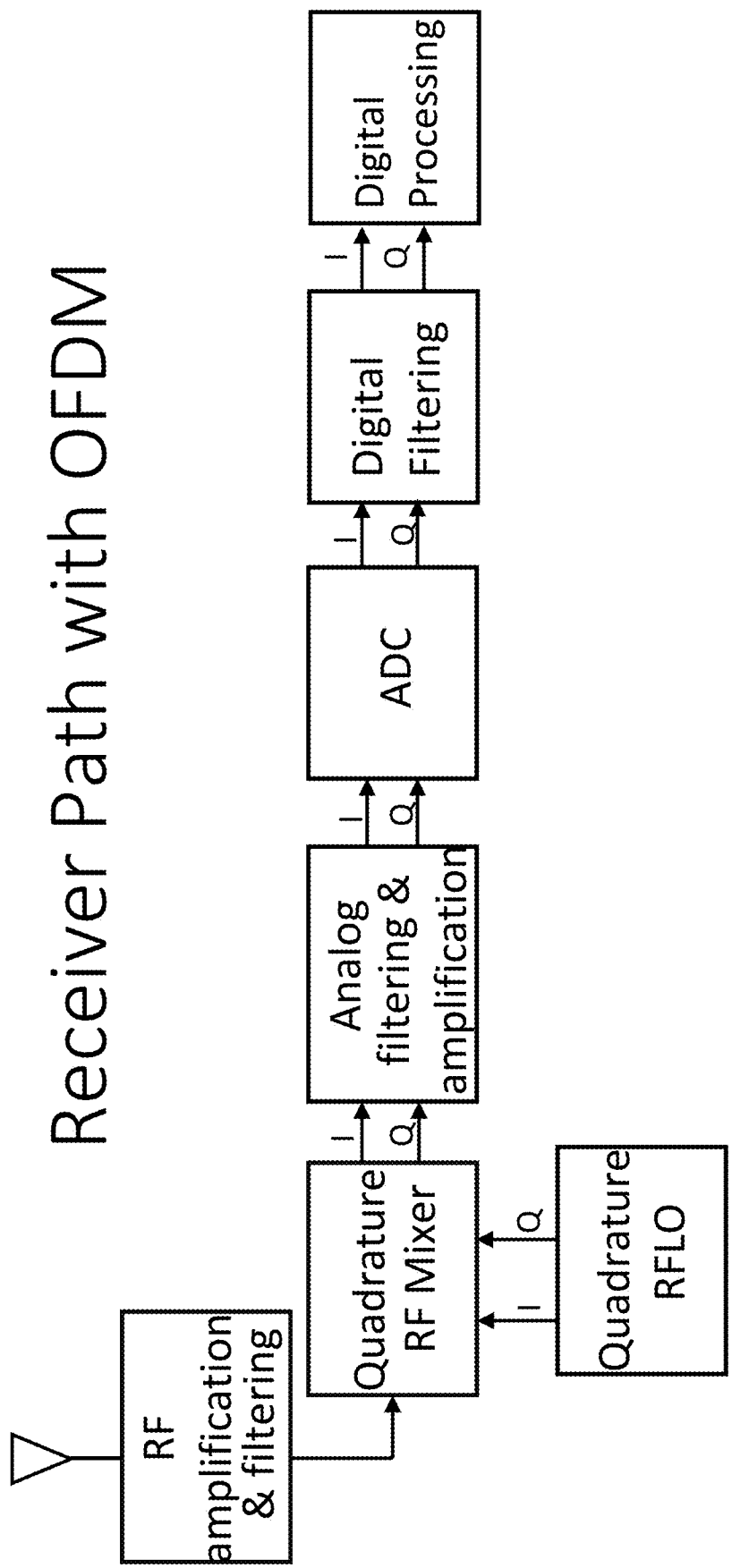
FIG. 25 is a block diagram of an alternative embodiment of a receiver configured for receiving transmitted radio signals that are modulated with OFDM according to an embodiment of the present invention.

The receiver path for an OFDM-based radar is shown in FIG. 25. It does not require an IF Mixer as a heterodyne architecture would, so it looks the same as a direct-down-conversion (homodyne) receiver. The digital processing of the baseband signal is tailored to OFDM. In one embodiment, correlators are used just as with PMCW, with the only difference being that the delayed transmitted signals they are using as one correlation input would be the OFDM signals transmitted instead of PMCW signals. In an alternative embodiment, the DFT of the received signal could be computed first, and correlations then performed within each frequency bin of the DFT output. The individual correlation results from each DFT bin are then recombined. Results from the DC frequency bin and/or low-frequency bins are ignored or de-weighted during the recombination of results in order to make the system more immune to DC offset and flicker noise that may be introduced by the analog circuits. Also, because the OFDM signal transmitted can easily be made free of DC and low frequencies, the digital filtering in FIG. 25 may include a notch filter that removes DC, which will filter out the DC offset and flicker noise introduced by the analog circuits without substantially affecting the desired signal.

Thus, embodiments of the present invention provide methods and a system for improving performance of a radar system that is affected by low frequency noise in the received signal. Such low frequency noise may include DC offset and/or flicker noise introduced by components of the radar system itself. Embodiments of the present invention provide better detectability of small objects and more accurate estimation of the distance, velocity, and position of all objects, by redistributing the signal power to frequencies separated from the low frequency noise, and by using filters to suppress the power of the low frequency noise without substantially suppressing the desired signal.

As described herein, the heterodyne embodiment of the present invention is designed such that the most problematic non-ideal components (i.e., those which cause the most DC offset and flicker noise) operate on the RF or IF signal instead of operating on the baseband signal. The intermediate frequency (IF) is chosen so that the noise power of the non-ideal components is predominantly separated in frequency from the power of the desired signal. Such a separation in frequency of signal from noise tends to inherently produce better radar system performance. In addition, the separation in frequency allows the noise to be suppressed using a frequency selective filter, which results in further improvements in radar system performance.

By choosing the intermediate frequency (IF) of an exemplary heterodyne radar receiver to be a relatively low frequency (compared to the RF), the bandwidth requirements of the IF portion of the receiver are reduced, and this can facilitate a design where the receiver's IF signal is digitized using an analog-to-digital converter (ADC), and subsequent signal processing operations, such as mixing to baseband and filtering, can be performed numerically, using digital logic circuits. The IF only need be sufficiently high to adequately separate the signal power spectrum from the DC offset and flicker noise spectrum. A key advantage of such a digital implementation of the IFLO mixer and baseband filtering is that it is not subject to the DC offsets and flicker noise that would tend to be generated if these functions were performed using CMOS analog circuits.

By choosing the intermediate frequency (IF) of a heterodyne radar transmitter to be a relatively low frequency (compared to the RF), the bandwidth requirements of the IF portion of the transmitter are reduced, and this can facilitate a design where the transmitter's IF signal is calculated numerically from the baseband signal using digital logic circuits to perform the mixing operation and optional filtering operations. Then the digital IF signal can be converted to the analog domain using an analog-to-digital converter (ADC), and then frequency shifted to RF. As with the heterodyne receiver, the IF only need be sufficiently high to adequately separate the signal power spectrum from the DC offset and flicker noise spectrum of the transmitter path components. A key advantage of such a digital implementation of the baseband filtering and the IF mixer of the transmitter is that they are not subject to the DC offsets and flicker noise that would tend to be generated if the processing were performed using CMOS analog circuits.

The choice of IF frequencies can be made independently in a radar system's receiver and its transmitter, or they can be chosen to be equal. If the IF frequencies are equal, the RF local oscillator (RFLO) can be shared between the transmitter and the receiver, which provides a significant advantage in both cost and radar system performance. When an IF is chosen low enough to facilitate digital implementation of the IF section, while still being high enough to adequately separate the signal spectrum from the low-frequency noise spectrum and DC offset, the radar system is considered to have a digital low-IF architecture (of its transmitter path, or of its receiver path, or both).

Another embodiment of the present invention accomplishes the redistribution of transmitted power over frequency directly through the design of the baseband signal itself. The combination of the baseband signal's modulation method and its method of generating the modulating signal are chosen to produce low baseband signal power at DC and low frequencies. One important example of this type of embodiment would be in a radar whose modulation is based on Orthogonal Frequency Division Modulation (OFDM), in which the baseband signal to be transmitted is produced via an inverse Fourier transform (IFT) on a sequence of symbols to be transmitted. When this approach is used, the portion of each symbol which represents DC and low frequencies can be set to zero, or the DC and low frequencies can be deemphasized by a weighting function, prior to the IFT. This will have the desired effect of greatly suppressing the transmitted signal power at and near DC, and therefore of separating in frequency the signal from the noise. The receiver path of an OFDM radio system can then simply discard, or by weighting it can de-emphasize, the recovered DC offset and low frequency symbols portions of each symbol.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A radar system comprising:
a transmitter configured to transmit a modulated radio signal, wherein the transmitter is configured to up-convert a first baseband signal to a selected first intermediate frequency (IF) signal before up-converting an analog version of the first IF signal to a selected radio frequency (RF) frequency of the transmitted radio signal, wherein the first baseband signal and the first IF signal are digital signals, wherein the transmitter comprises a digital-to-analog converter configured to convert the first IF signal into a first analog IF signal, wherein the transmitter is configured to up-convert the first analog IF signal to the selected RF frequency, wherein up-converting a signal increases a frequency of the signal, and wherein up-converting the first baseband signal to the first IF signal shifts a signal energy to a frequency of the first IF signal, wherein the signal energy of the first IF signal is separated enough from a DC offset and a flicker noise spectrum of the transmitter such that the first IF signal is DC free and with reduced power signal energy at frequencies at or near DC, which are affected by flicker noise; and a receiver configured to receive radio signals that includes the transmitted radio signal transmitted by the transmitter and reflected from objects in an environment, wherein the receiver is configured to down-convert the received radio signals to a second IF signal, wherein down-converting a signal lowers a frequency of the signal, and wherein the receiver is further configured to down-convert the second IF signal to a second baseband signal for further processing to determine at least one of a distance, velocity, and position of objects in the environment.

2. The radar system of claim 1, wherein the transmitter is a heterodyne transmitter and comprises a quadrature mixer operable to frequency shift the first baseband signal to the first IF signal, and further operable to frequency shift the first IF signal to the selected RF frequency of the transmitted radio signal.

3. The radar system of claim 2, wherein the receiver is a heterodyne receiver and comprises a quadrature mixer operable to frequency shift the received radio signal to the second IF signal, and further operable to frequency shift the second IF signal to the second baseband signal.

4. The radar system of claim 3, wherein the quadrature mixers are configured to perform frequency shifts utilizing complex (I and Q) signal representations of the first and second IF signals.

5. The radar system of claim 3, wherein each of the first and second intermediate frequencies are: (1) at least one-half of a two-sided bandwidth of the baseband signals and (2) at most one-half of a maximum sample rate of a digital-to-analog converter (DAC) in the transmitter.

6. The radar system of claim 3, wherein each of the first and second intermediate frequencies are between 1 GHz and 4 GHz.

7. The radar system of claim 3, wherein each of the first and second intermediate frequencies are a same frequency.

8. The radar system of claim 1, wherein the transmitter and receiver are configured for installation and use on a vehicle.

9. The radar system of claim 1, wherein the transmitted radio signal is a phase modulated continuous wave radio signal, and wherein spreading codes used for phase modulating comprise one of random codes and pseudo-random codes.

10. The radar system of claim 1, wherein the receiver comprises one or more correlators for further processing of second baseband signal to determine at least one of a distance, velocity, and position of objects in the environment.

11. A radar system comprising:
a transmitter configured to transmit modulated radio signals, wherein the transmitter comprises a symbol generator and an inverse Discrete Fourier Transform (DFT), wherein the symbol generator is configured to produce symbol values of only zeros or complex values with a reduced weighting for samples corresponding to frequencies at or near Direct Current (DC), such that the symbols passed through the inverse DFT produce a first baseband signal that is DC free and with reduced power signal energy at the frequencies at or near DC, which are affected by flicker noise; and
a receiver configured to receive radio signals that include the transmitted radio signals transmitted by the transmitter and reflected from objects in an environment, wherein the receiver is configured to down-convert the received radio signals to a second baseband signal for further processing to determine at least one of a distance, velocity, and position of objects in the environment.

12. The radar system of claim 11, wherein the receiver comprises at least one correlator, wherein the at least one correlator is operable to compare the received radio signals to delayed versions of the modulated radio signal.

13. The radar system of claim 11, wherein the receiver comprises a notch filter configured to remove DC, such that DC offset and flicker noise is removed from the second baseband signal.

14. The radar system of claim 11, wherein the transmitter and receiver are configured for mounting and operation in a vehicle.

15. The radar system of claim 11, wherein the modulated radio signal is an orthogonal frequency division modulated (OFDM) signal.

16. The radar system of claim 15, wherein the symbols are random or pseudo-random.

17. A radar system comprising:
a transmitter configured to transmit a modulated radio signal, wherein the transmitter is configured to up-convert a first baseband signal to a selected first intermediate frequency (IF) signal before an analog version of the first IF signal is up-converted to a selected radio frequency (RF) frequency of the transmitted radio signal, wherein the first baseband signal and the first IF signal are digital signals, wherein the transmitter comprises a digital-to-analog converter configured to convert the first IF signal into a first analog IF signal, wherein the transmitter is configured to up-convert the first analog IF signal to the selected RF frequency, wherein up-converting a signal increases a frequency of the signal, and wherein up-converting the first baseband signal to the first IF signal shifts a signal energy to a frequency of the first IF signal, wherein the signal energy of the first IF signal is separated enough from a DC offset and a flicker noise spectrum of the transmitter such that the first IF signal is DC free and with reduced power signal energy at frequencies at or near DC, which are affected by flicker noise; and
a receiver configured to receive the radio signals transmitted by the transmitter and reflected from objects in an environment, and is configured to process the received radio signals to determine at least one of a distance, velocity, and position of objects in the environment; and
an IF mixer configured to up-convert the first baseband signal to the first IF signal, and further configured to down-convert the received radio signal to a second IF signal, wherein down-converting a signal decreases a frequency of the signal;

wherein the receiver is operable to amplify and/or filter the second IF signal, and wherein the receiver is further configured to down-convert the second IF signal to a second baseband signal for further processing to determine the at least one of distance, velocity and position of objects in the environment.

18. The radar system of claim 17, wherein the first and second intermediate frequencies are a same frequency.

19. The radar system of claim 18, wherein a selected frequency of the first and second intermediate frequencies is: (1) at least one-half of a two-sided bandwidth of the baseband signals and (2) at most one-half of a maximum sample rate of a digital-to-analog converter (DAC) in the transmitter.

20. The radar system of claim 18, wherein a selected frequency of the first and second intermediate frequencies is between 1 GHz and 4 GHz.

* * * * *